(12) United States Patent
Moon et al.

(10) Patent No.: US 10,854,957 B2
(45) Date of Patent: Dec. 1, 2020

(54) ELECTRONIC DEVICE INCLUDING ANTENNA

(71) Applicant: SAMSUNG ELECTRONICS CO., LTD., Suwon-si (KR)

(72) Inventors: Heecheul Moon, Suwon-si (KR); Sangyoup Seok, Suwon-si (KR); Kwonho Son, Suwon-si (KR); Inkuk Yun, Suwon-si (KR); Sunghyup Lee, Suwon-si (KR); Heeseok Jung, Suwon-si (KR); Chongo Yoon, Suwon-si (KR); Jongchul Choi, Suwon-si (KR)

(73) Assignee: Samsung Electronics Co., Ltd., Suwon-si (KR)

(*) Notice: Subject to any disclaimer, the term of this patent is extended or adjusted under 35 U.S.C. 154(b) by 0 days.

(21) Appl. No.: 16/778,171

(22) Filed: Jan. 31, 2020

(65) Prior Publication Data

US 2020/0266520 A1     Aug. 20, 2020

(30) Foreign Application Priority Data

Feb. 19, 2019  (KR) .................. 10-2019-0019557
Aug. 7, 2019   (KR) .................. 10-2019-0096379

(51) Int. Cl.
*H01Q 1/24*     (2006.01)
*G06F 1/16*     (2006.01)
(Continued)

(52) U.S. Cl.
CPC .......... *H01Q 1/243* (2013.01); *G06F 1/1637* (2013.01); *G06F 1/1683* (2013.01); *H01Q 1/38* (2013.01); *H01Q 9/0407* (2013.01)

(58) Field of Classification Search
CPC .......... H01Q 1/22; H01Q 1/24; H01Q 1/243; H01Q 1/38; H01Q 9/04; H01Q 9/0407;
(Continued)

(56) References Cited

U.S. PATENT DOCUMENTS 5,563,772 A * 10/1996 Nichols ................. G06F 13/409
                                                    174/17 R
6,661,385 B2 * 12/2003 Zinsmeister ............... B60J 7/00
                                                    343/711
(Continued)

FOREIGN PATENT DOCUMENTS

| EP | 2975695 A1 | 1/2016 |
| JP | 2003-254476 | 9/2003 |
| JP | 2011-055279 A | 3/2011 |

OTHER PUBLICATIONS

International Search Report dated Jun. 19, 2020 for PCT/KR2020/001537; 11 pgs.

*Primary Examiner* — Tho G Phan
(74) *Attorney, Agent, or Firm* — Nixon & Vanderhye P.C.

(57) ABSTRACT

An electronic device in accordance with an example embodiment of the disclosure includes a first non-conductive cover defining a first surface of the electronic device, a second non-conductive cover including a first portion defining a second surface of the electronic device, and a second portion defining one portion of a lateral surface of the electronic device, a conductive frame defining an other portion of the lateral surface of the electronic device, and an antenna module, wherein the antenna module is positioned so that the one surface is substantially perpendicular to the second surface at a position within a specified proximity to the lateral surface of the electronic device and is configured to transmit and/or receive a signal through the lateral surface.

20 Claims, 23 Drawing Sheets

(51) Int. Cl.
*H01Q 1/38* (2006.01)
*H01Q 9/04* (2006.01)

(58) Field of Classification Search
CPC ... H05K 1/02; H05K 1/11; H05K 1/18; H05K 5/00; H05K 9/00; H05K 9/0024; H05K 9/0032; H05K 1/023; G06F 1/16; G06F 1/1637; G06F 1/1683
See application file for complete search history.

(56) References Cited

U.S. PATENT DOCUMENTS

| | | | |
|---|---|---|---|
| 7,489,279 B2* | 2/2009 | Ikeda | H01Q 1/1271 343/713 |
| 8,174,452 B2* | 5/2012 | Ayala Vazquez | H01Q 1/2266 343/702 |
| 8,427,379 B2* | 4/2013 | Rothkopf | H01Q 1/243 343/702 |
| 9,787,809 B2 | 10/2017 | Jeong | |
| 9,985,338 B2* | 5/2018 | Choon | H01Q 5/328 |
| 10,396,434 B2 | 8/2019 | Koo et al. | |
| 10,594,845 B2* | 3/2020 | Hebert | H04M 1/0262 |
| 10,700,415 B2 | 6/2020 | Shin et al. | |
| 2017/0048366 A1 | 2/2017 | Jeong | |
| 2017/0207516 A1 | 7/2017 | Koo et al. | |
| 2017/0250460 A1 | 8/2017 | Shin et al. | |

* cited by examiner

ELECTRONIC DEVICE INCLUDING ANTENNA

CROSS-REFERENCE TO RELATED APPLICATIONS

This application is based on and claims priority under 35 U.S.C. § 119 to Korean Patent Application No. 10-2019-0019557, filed on Feb. 19, 2019 in the Korean Intellectual Property Office, and Korean Patent Application No. 10-2019-0096379, filed on Aug. 7, 2019, in the Korean Intellectual Property Office, the disclosures of which are incorporated by reference herein their entireties.

BACKGROUND

1. Field

The disclosure relates to an electronic device including an antenna for a wireless communication.

2. Description of Related Art

An electronic device such as a smart phone, a tablet PC may perform wireless communication. Recently, an electronic device capable of performing 5G communication using millimeter-wave (hereinafter, "mmWave") has been released. The term "mmWave" may refer to an ultra-high frequency of approximately 6 GHz to 300 GHz. The electronic device may include a plurality of antenna modules therein, and may transmit and receive a mmWave signal in various directions.

An electronic device transmits and receives an RF signal using a metal housing exposed to an outside or a metal radiator disposed therein, or using a metal radiator containing polycarbonate (PC). Alternatively, the electronic device transmits and receives an RF signal using a radiator of a metal pattern plated on a surface of a PC radiator. In the electronic device, a communication circuit or modem connected to an antenna radiator may be mounted on a printed circuit board and may be separately from the antenna radiator.

When the electronic device supports communication protocols (e.g., a frequency of 6 GHz or smaller) lower than or including a 4G communication protocol, the electronic device performs wireless communication using a radiator made of metal materials inside and outside the electronic device.

When the electronic device supports a 5G communication protocol, the electronic device uses a high frequency band width (e.g., a wavelength of about 6 GHz to 100 GHz). Thus, the electronic device has an antenna module mounted therein including a combination of a plurality of dipole antennas and a patch antenna to perform wireless communication. The electronic device may not be able to efficiently transmit and receive a 5G signal in various directions depending on a mounting position of the antenna module, a fixed structure thereof at the mounting position, an arrangement of components around the mounting position, an external element, a distance from the external element, and the like.

The above information is presented as background information only to assist with an understanding of the disclosure. No determination has been made, and no assertion is made, as to whether any of the above might be applicable as prior art with regard to the disclosure.

SUMMARY

Embodiments of the disclosure provide an electronic device having an antenna. According to an example embodiment, an electronic device may include a display, a housing having a first surface through which the display is viewable, a second surface opposite the first surface, lateral surfaces between the first surface and the second surface, a first antenna module including at least one antenna disposed inside the housing adjacent to a first lateral surface of the lateral surfaces, and a second antenna module including at least one antenna disposed inside the housing adjacent to a second lateral surface of the lateral surfaces. The housing may include a first plate covering the first surface a second plate covering the second surface, and a conductive structure comprising a conductive material disposed between the first surface and the second surface and at least partially exposed to the outside through the lateral surfaces. A height of a portion of the second plate extending along the first lateral surface may be less than a height of a portion of the second plate extending along the second lateral surface.

According to an example embodiment, an electronic device may include a first non-conductive cover defining at least a portion of a first surface of the electronic device, a second non-conductive cover including a first portion defining at least a portion of a second surface of the electronic device opposite the first surface, and a second portion extending from an edge of the first portion and defining one portion of a lateral surface of the electronic device between the first surface and the second surface, a conductive frame defining an other portion of the lateral surface of the electronic device, and an antenna module including one surface defining a radiator, wherein the antenna module is positioned so that the one surface is substantially perpendicular to the second surface at a position within a specified proximity to the lateral surface of the electronic device and is configured to transmit and/or receive a signal through the lateral surface, wherein the second non-conductive cover comprises glass, wherein at least a half of the one surface of the antenna module is directed toward the second portion of the second non-conductive cover.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the present disclosure will be more apparent from the following detailed description taken, in conjunction with the accompanying drawings, in which.

DETAILED DESCRIPTION

Figure 1:
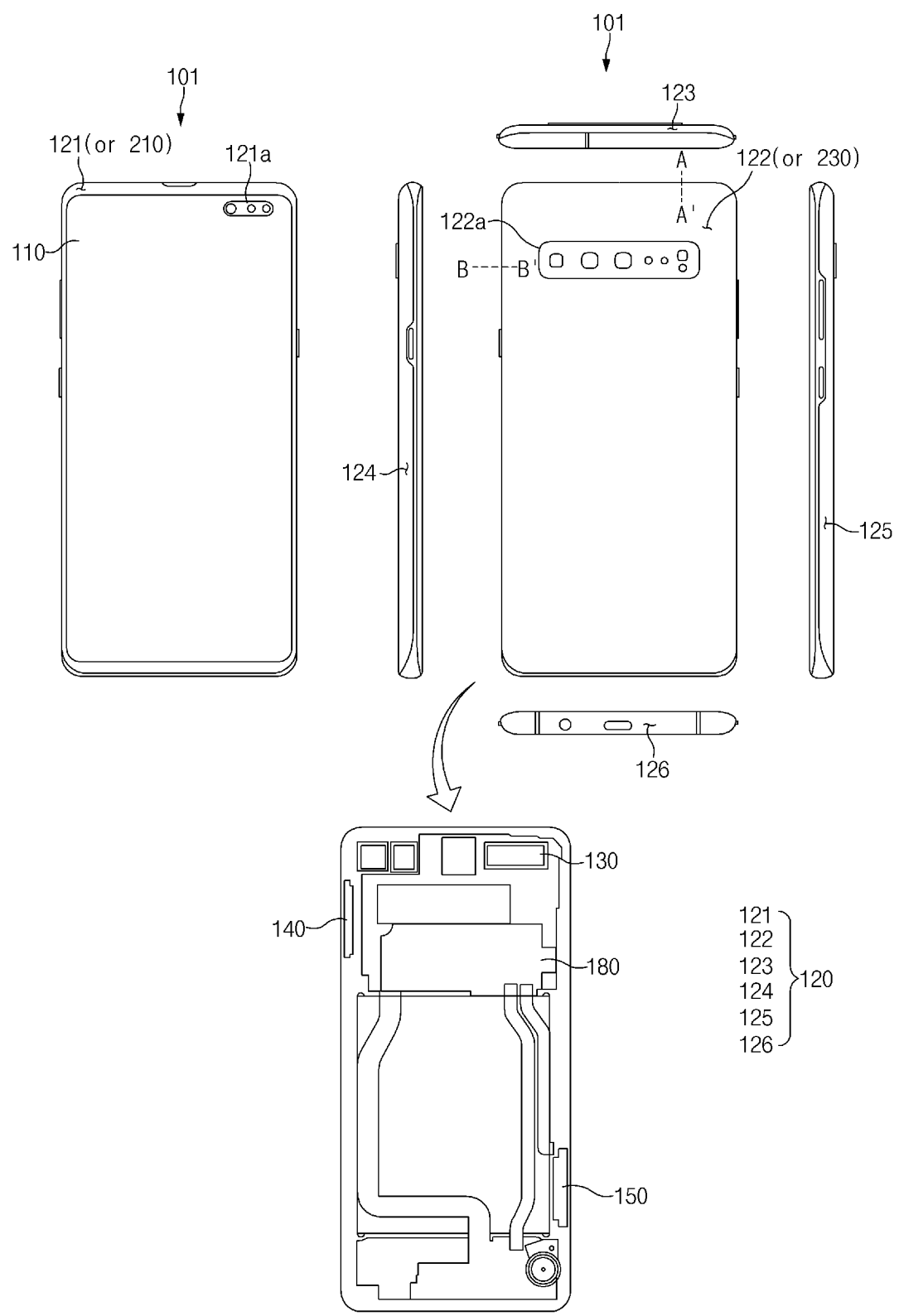
FIG. 1 is a diagram illustrating an appearance of an example electronic device according to various embodiments.

Hereinafter, various example embodiments of the disclosure are described with reference to the accompanying drawings. However, it should be understood that the various example embodiments are not intended to limit techniques described in the disclosure to specific embodiments and the disclosure includes various modifications, equivalents, and/or alternatives of the embodiments of the disclosure. In connection with the description of the drawings, similar reference numerals may be used for similar components.

FIG. 1 is a diagram illustrating an example appearance of an example electronic device according to various embodiments.

Referring to FIG. 1, an electronic device 101 may include a display 110 and a housing 120.

The display 110 may display various contents such as a text or an image. The display 110 may be exposed or viewable through a first surface 121 of the housing 120. The display 110 may occupy most of the first surface 121 of the housing 120. The display 110 may have a structure in which a plurality of layers including a display panel and a touch panel are stacked.

The housing 120 may include the first surface 121, a second surface 122, a first lateral surface 123, a second lateral surface 124, a third lateral surface 125, and a fourth lateral surface 126.

The first surface 121 may be a surface through which the display 110 is exposed or viewable. Most of the first surface 121 may include an active region of the display 110.

According to various embodiments, the first surface 121 may be implemented as one plate 210 (see, e.g., FIG. 2, hereinafter, a first plate) (or a first glass panel or a first non-conductive cover). The first plate 210 may include a non-conductive material (e.g. glass or plastic). For example, the first plate 210 may be a glass panel or a glass cover that covers a display panel.

According to various embodiments, the first plate 210 may be planar along and on the first surface 121, and may at least partially extend to the first lateral surface 123, the second lateral surface 124, the third lateral surface 125, or the fourth lateral surface 126. The portion of the first plate 210 extending to the first lateral surface 123, the second lateral surface 124, the third lateral surface 125 or the fourth lateral surface 126 may have a curved surface shape with a specified curvature.

According to various embodiments, the first plate may include a hole 121a provided in at least a portion thereof accommodating a sensor or a front camera.

According to various embodiments, the second surface 122 may be a surface opposite to the first surface 121. The second surface 122 may be a surface through which the display 110 is not exposed or viewable.

According to various embodiments, the second surface 122 may be implemented as one plate 230 (see, e.g., FIG. 2 hereinafter, a second plate) (or a second glass panel or a second non-conductive cover). The second plate 230 may include a non-conductive material (e.g. glass or plastic). The second plate 230 may include the same material as the first plate 210.

The second plate 230 may be planar along and on the second surface 122. At least a portion thereof may extend to the first lateral surface 123, the second lateral surface 124, the third lateral surface 125, or the fourth lateral surface 126. The portion extending to the first lateral surface 123, the second lateral surface 124, the third lateral surface 125 or the fourth lateral surface 126 may have a curved surface shape with a specified curvature.

According to various embodiments, the second plate 230 may include a hole 122a provided in at least a portion thereof accommodating a sensor or a rear camera.

The first lateral surface 123 (e.g., a top surface), the second lateral surface 124 (e.g., a left lateral surface), the third lateral surface 125 (e.g., a right lateral surface) or the fourth lateral surface 126 (e.g., a bottom surface) may include at least a portion of a curved portion of the first plate, a curved portion of the second plate or a conductive structure (or a conductive frame) (e.g., a metal housing).

According to an example embodiment, a surface area occupied by the curved portion of the first plate, a surface area occupied by the curved portion of the second plate, or a surface area occupied by the conductive structure may vary based on the first lateral surface 123 (e.g., a top surface), the second lateral surface 124 (e.g., a left lateral surface), the third lateral surface 125 (e.g., a right lateral surface), or the fourth lateral surface 126 (e.g., a bottom surface).

For example, the first lateral surface 123 (e.g., a top surface) may be substantially occupied by the curved portion of the second plate and the conductive structure. The fourth lateral surface 126 opposed to the first lateral surface 123 may be substantially occupied by the conductive structure.

In another example, each of the second lateral surface 124 and the third lateral surface 125 may include all of the curved portion of the first plate, the curved portion of the second plate, and the conductive structure having different heights (or surface areas).

According to various embodiments, the housing 120 may include various components necessary for driving the electronic device 101 therein. For example, the housing 120 may include a main substrate 180 therein. The main substrate 180 may have various components such as a processor, a memory, and a wireless communication circuit mounted inside the housing 120. According to an embodiment, the wireless communication circuit may transmit and receive a signal having a frequency between about 6 GHz and 100 GHz. Further, the housing 120 may include various components such as a battery, a sensor, a camera module, a speaker or a connector therein.

According to various embodiments, the electronic device 101 may include a plurality of antenna modules 130, 140, and 150 inside the housing 120. Each antenna module may transmit and receive a signal of a specified frequency band.

According to various embodiments, the plurality of antenna modules 130, 140, and 150 may transmit and receive a signal of a millimeter-wave or mmWave according to the 5G communication protocol. The millimeter wave may be an ultra-high frequency of about 6 to 300 GHz. The millimeter wave may increase transmission/reception efficiency using a beamforming technique of multiple antennas. The plurality of antenna modules 130, 140, and 150 may transmit millimeter waves in a specified direction via beamforming technology. The plurality of antenna modules 130, 140, and 150 may be disposed in the housing 120 in various forms to smoothly transmit and receive the RF signal in six directions of the electronic device 101.

According to an example embodiment, the plurality of antenna modules 130, 140, and 150 may include the first antenna module 130, the second antenna module 140, and the third antenna module 150.

The first antenna module 130 may be disposed adjacent to the first lateral surface 123. The first antenna module 130 may include two different types of antennas (e.g., a patch antenna and a dipole antenna). The first antenna module 130 may radiate a signal to the first surface 121, the second surface 122, or the first lateral surface 123 of the electronic device 101.

The second antenna module 140 may be disposed adjacent to a top of the second lateral surface 124. In an example embodiment, the second antenna module 140 may include one type of an antenna (e.g., a patch antenna). The second antenna module 140 may radiate a signal to the first surface 121, the second surface 122, or the second lateral surface 124 of the electronic device 101. In another embodiment, the second antenna module 140 may include a first type antenna and a second type antenna. For example, the first type antenna may be a patch antenna disposed so that a first radiating surface is directed toward the second lateral surface 124. The second type antenna may be a dipole antenna disposed so that a second radiating surface is directed toward the first lateral surface 123.

The third antenna module 150 may be disposed adjacent to a bottom of the third lateral surface 125. In an example embodiment, the third antenna module 150 may include one type of an antenna (e.g., a patch antenna). The third antenna module 150 may radiate the signal to the first surface 121, the second surface 122, or the third lateral surface 125 of the electronic device 101. In another embodiment, the third antenna module 150 may include a first type antenna and a second type antenna. For example, the first type antenna may be a patch antenna disposed so that a first radiating surface is directed toward the third lateral surface 125. The second type antenna may be a dipole antenna positioned so that a second radiating surface is directed toward the fourth lateral surface 126.

Figure 2:
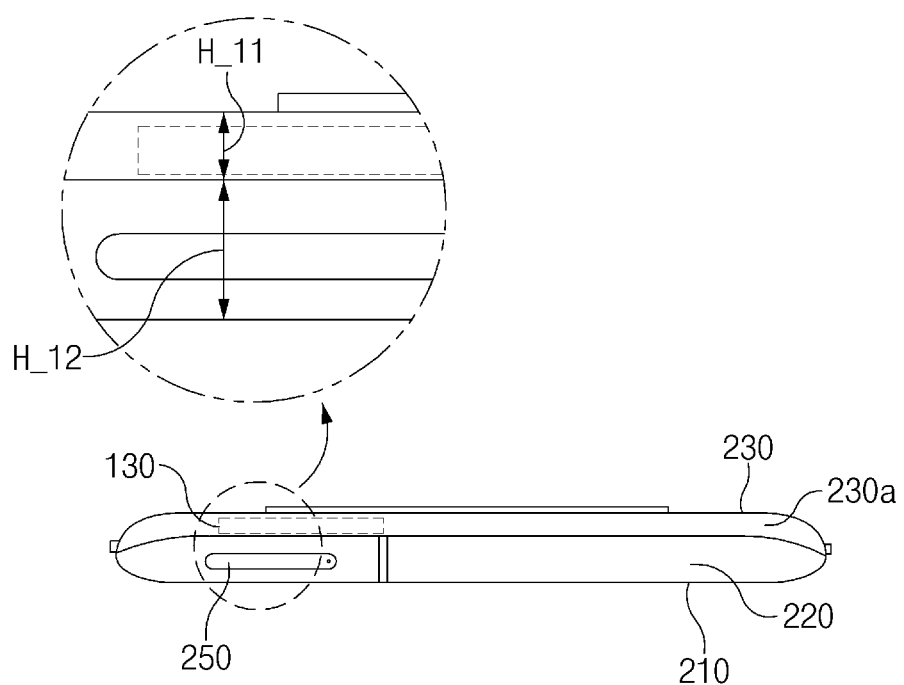
FIG. 2 is a diagram illustrating example placement of a first antenna module on a first lateral surface according to various embodiments.

FIG. 2 is a diagram illustrating example placement of the first antenna module on the first lateral surface according to various embodiments.

Referring to FIG. 2, the first lateral surface (the first lateral surface (123) of FIG. 1) may include a curved portion 230a of the second plate 230 and a conductive structure (or a conductive frame) 220. Across the first lateral surface 123, the curved portion of the first plate 210 may occupy a relatively small portion as compared to the curved portion 230a and the conductive structure 220 of the second plate 230 may occupy. The curved portion of the first plate 210 may be absent along and on the first lateral surface 123.

For example, in a portion of the first lateral surface 123 adjacent to the first antenna module 130, a height (or a thickness) H_11 of the curved portion 230a of the second plate 230 may be less than or equal to a height (or a thickness) H_12 of the conductive structure 220.

According to various embodiments, the conductive structure 220 may include an opening into which a tray 250 may be inserted.

According to various embodiments, the first antenna module 130 may be disposed adjacent to the first lateral surface 123. The first antenna module 130 may include two different types of antennas (e.g., a patch antenna and a dipole antenna).

According to various embodiments, the first antenna module 130 may be disposed inside the electronic device 101 and may be closer to the second plate 230 than to the first plate 210. The first antenna module 130 may radiate the mmWave signal through the second plate 230 or the curved portion 230a of the second plate 230.

Figure 3:
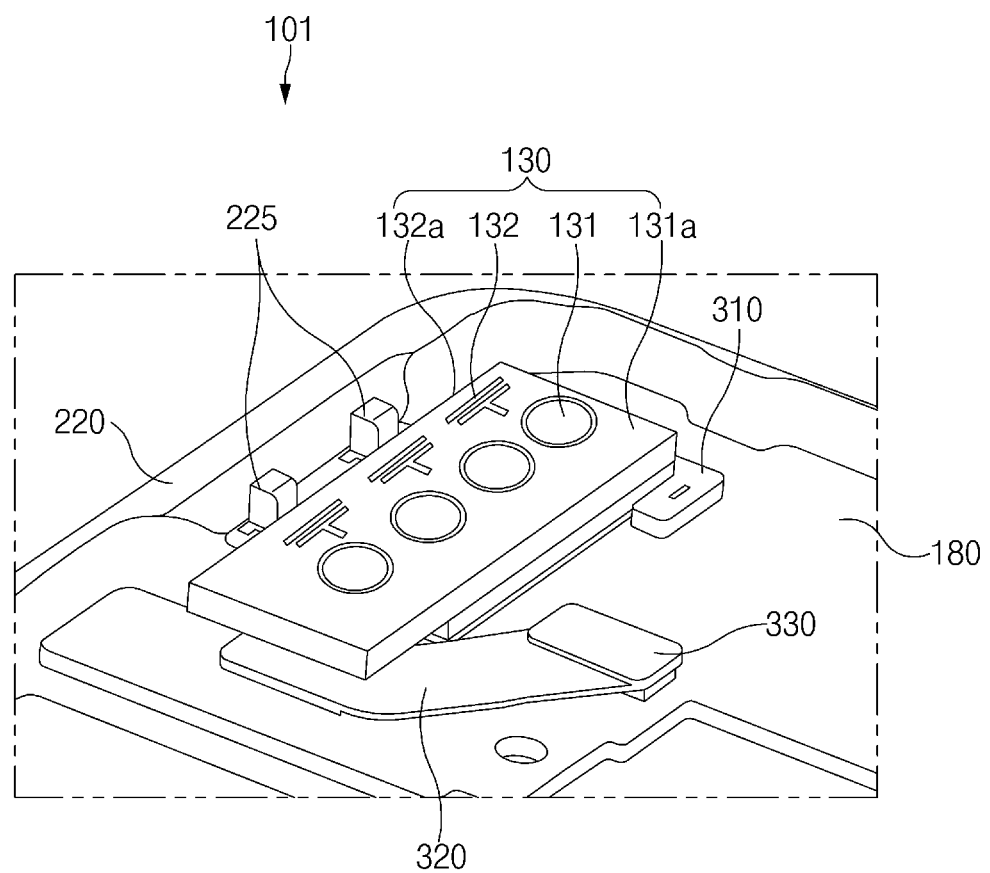
FIG. 3 is a diagram illustrating an example placement mode of a first antenna module according to various embodiments.

FIG. 3 is a diagram illustrating an example placement mode of the first antenna module according to various embodiments. FIG. 3 is an example and the disclosure is not limited thereto.

Referring to FIG. 3, in a region adjacent to the first lateral surface 123, the electronic device 101 may include the conductive structure 220, a contact 225, the first antenna module 130, a guide 310, a flexible printed circuit board 320, a connector 330, and the main substrate 180.

The conductive structure 220 may form a portion of a lateral surface of the housing 120. The conductive structure 220 may act as an antenna radiator for transmitting and receiving a signal having a specified frequency band. For example, the conductive structure 220 may act as an antenna radiator for the 4G communication (e.g., a signal of 6 GHz or lower).

The contact 225 may be electrically connected with the conductive structure 220. The contact 225 may be in contact with a feed point or a ground point of the conductive structure 220 and may be electrically connected to the main substrate 180 inside the housing 120. For example, the contact 225 may transmit an RF signal for the 4G communication.

According to various embodiments, the first antenna module 130 may include a first type antenna 131 and a second type antenna 132.

The first type antenna 131 may be a patch antenna disposed so that a first radiating surface (or a patch surface) 131a is directed toward the second plate 230. The first type antenna 131 may radiate the mmWave signal through the second plate 230.

The second type antenna 132 may be a dipole antenna disposed so that a second radiating surface 132a is directed toward the first lateral surface 123. The second type antenna 132 may radiate the mmWave signal through the second plate 230 or the curved portion 230a of the second plate 230.

The guide 310 may guide a placement position of the first antenna module 130. The flexible printed circuit board 320 may be connected to one end of the first antenna module 130. The flexible printed circuit board 320 may transmit a signal which the first antenna module 130 transmits and receives. The connector 330 may electrically connect the flexible printed circuit board 320 and the main substrate 180 with each other.

On the main substrate 180, elements such as a communication circuit, a processor or a memory may be mounted such that the elements may be electrically connected to each other via the main substrate 180. The main substrate 180 may be electrically connected to the first antenna module 130 via the flexible printed circuit board 320 and the connector 330.

Figure 4:
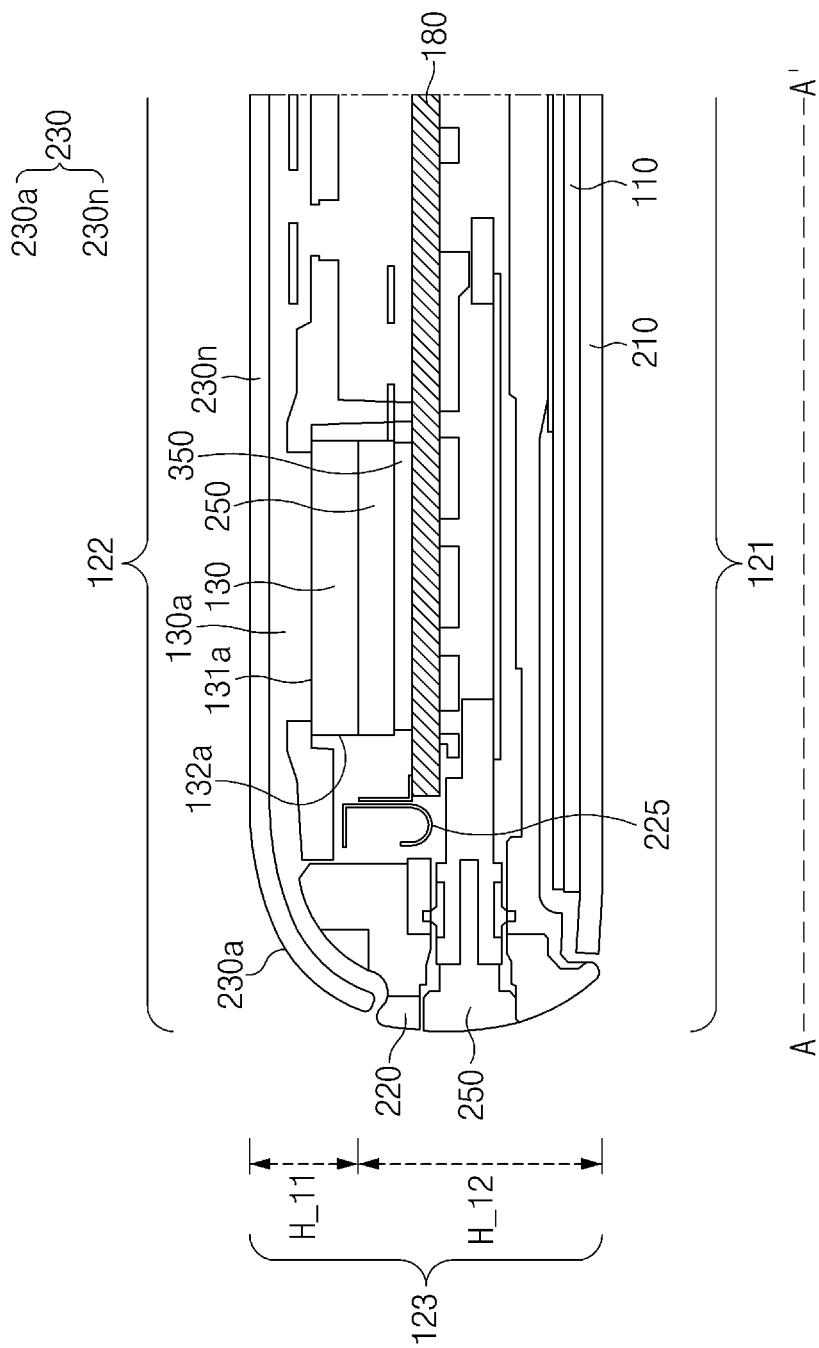
FIG. 4 is a cross-sectional view illustrating a region adjacent to a first antenna module according to various embodiments.

FIG. 4 is a cross-sectional view illustrating an example region adjacent to the first antenna module according to various embodiments. FIG. 4 may be a cross-sectional view taken across a line A-A' in FIG. 1. FIG. 4 is illustrative and the disclosure is not limited thereto.

Referring to FIG. 4, in a region adjacent to the first antenna module 130, the electronic device 101 may include the first plate 210, the conductive structure 220, the contact 225, the second plate 230, the first antenna module 130, the main substrate 180, and an adhesive member 350.

The first plate 210 may include a non-conductive material (e.g., glass or plastic). The first plate 210 may not extend to the first lateral surface 123.

The conductive structure 220 may form a portion of the first lateral surface 123 of the housing 120. The conductive structure 220 may act as an antenna radiator for 4G communication. The conductive structure 220 may include an opening into which the tray 250 may be inserted. The tray 250 may hold a SIM card or a memory card therein.

The second plate 230 may include a non-conductive material (e.g. glass or plastic). The second plate 230 may form a planar portion 230n along and on the second surface 122 of the housing 120. The second plate 230 may at least partially extend to the first lateral surface 123 to define the curved portion 230a. The curved portion 230a may have a curved surface shape having a specified curvature.

In the first lateral surface 123 of the housing 120, the conductive structure 220 may abut the curved portion 230a of the second plate 230. The conductive structure 220 and the curved portion 230a of the second plate 230 may occupy most of the first lateral surface 123. For example, in a portion of the first lateral surface 123 adjacent to first antenna module 130, a height (or a thickness) H_11 of the curved portion 230a of the second plate 230 may be less than or equal to a height (or a thickness) H_12 of the conductive structure 220. On the other hand, the first plate 210 may not extend to the first lateral surface 123 or may have a smaller height than those of the curved portion 230a of the second plate 230 and the conductive structure 220.

The contact 225 may be electrically connected with the conductive structure 220. The contact 225 may be in contact with a feed point or a ground point of the conductive structure 220 and may be electrically connected to the main substrate 180 inside the housing 120. The contact 225 may transfer an RF signal for 4G communication.

The first antenna module 130 may have the first radiating surface 131a. The first radiating surface 131a may be a surface from which the first type antenna (e.g., a patch antenna) 131 radiates an mmWave signal. A radiating space (or an air gap) 130a may be defined between the first radiating surface 131a of the first antenna module 130 and the second plate 230.

The first type antenna (e.g., a patch antenna) 131 may radiate an mmWave signal through the radiating space (or an air gap) 130a.

On the main substrate 180, the first antenna module 130 may be mounted. The main substrate 180 may be electrically connected to a communication circuit and a processor.

The adhesive member 350 may be disposed between the first antenna module 130 and the main substrate 180. The adhesive member 350 may fix the first antenna module 130 to the main substrate 180.

Figure 5:
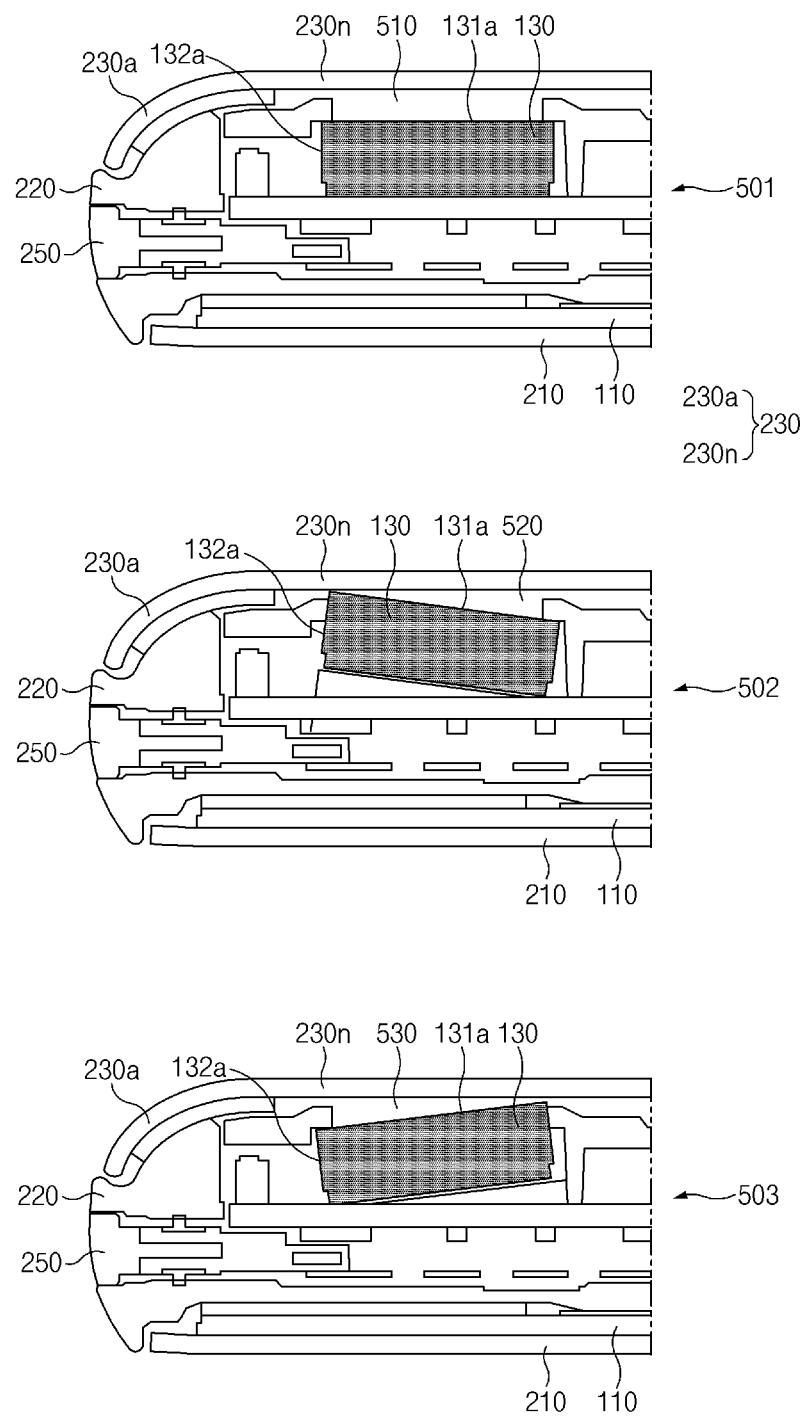
FIG. 5 is a diagram illustrating example placement tilt change of a first antenna module according to various embodiments.

FIG. 5 is a diagram illustrating example placement tilt change of the first antenna module according to various embodiments.

Referring to FIG. 5, in a first placement mode 501, the first antenna module 130 may have the first radiating surface 131a parallel to the planar portion 230n of the second plate 230. The first radiating surface 131a may be a surface from which the first type antenna (e.g., a patch antenna) 131 emits the mmWave signal. A rectangular radiating space (or an air gap) 510 may be defined between the first radiating surface 131a of the first antenna module 130 and the second plate 230. The first type antenna (e.g., a patch antenna 131) may radiate the mmWave signal through the radiating space (or an air gap) 510.

In a second placement mode 502 or third placement mode 503, the first antenna module 130 may have an inclined first radiating surface 131a that is not parallel to the planar portion 230n of the second plate 230. The first radiating surface 131a may be a surface from which the first type antenna (e.g., a patch antenna) 131 emits the mmWave signal. A triangular radiating space (or an air gap) 520 or 530 may be defined between the first radiating surface 131a of the first antenna module 130 and the second plate 230. The first type antenna (e.g., a patch antenna 131) may radiate the mmWave signal through the radiating spaces (or air gaps) 520 and 530.

In the second placement mode 502, the first radiating surface 131a may be tilted toward a center of the planar portion 230n of the second plate 230 to improve radiating performance in a direction toward the planar portion 230n of the second plate 230. The second radiating surface 132a may be directed toward a location between the planar portion 230n and the curved portion 230a of the second plate 230.

In the third placement mode 503, to improve radiating performance in a direction toward the display 110, the first radiating surface 131a may be tilted to be directed toward a location between the planar portion 230n and the curved portion 230a of the second plate 230. The second radiating surface 132a may be directed toward the conductive structure 220 or connector 250.

Figure 6:
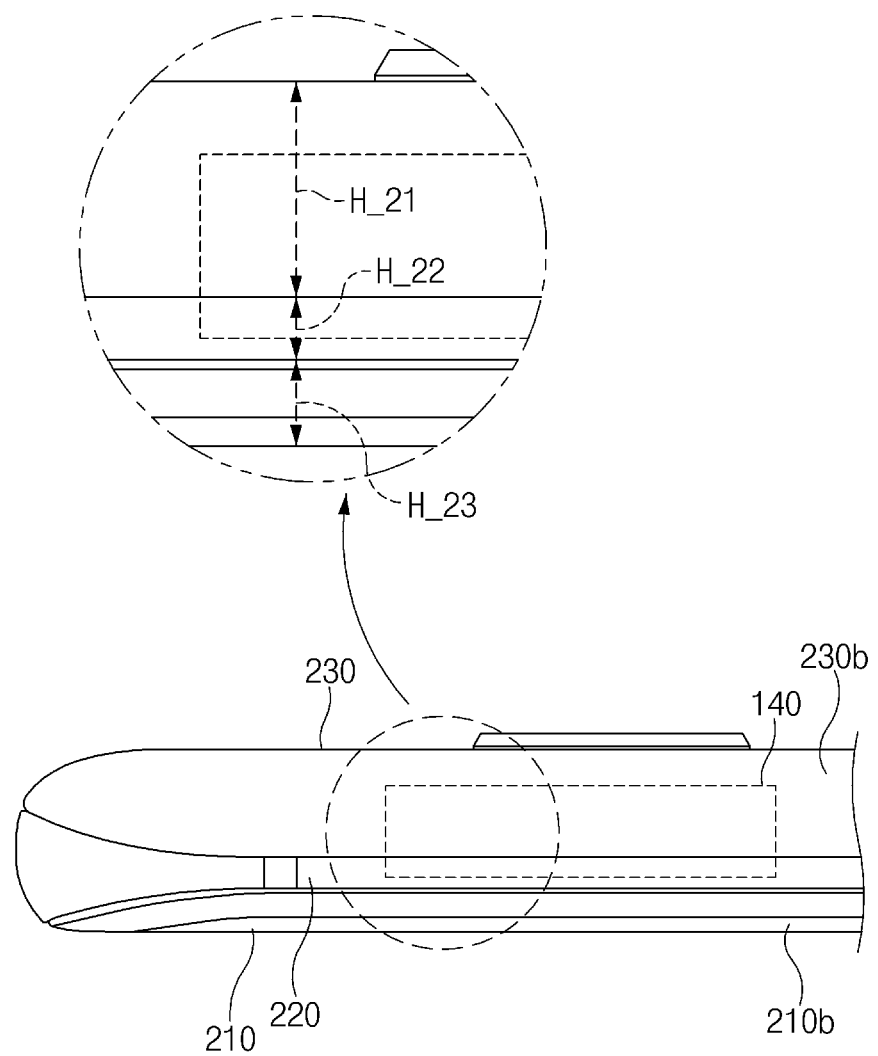
FIG. 6 is a diagram illustrating example placement of a second antenna module on a second lateral surface according to various embodiments.

FIG. 6 is a diagram illustrating example placement of the second antenna module on the second lateral surface according to various embodiments.

Referring to FIG. 6, the second lateral surface (e.g., a left lateral surface) (the second lateral surface 124 of FIG. 1) may include all of a curved portion 230b of the second plate 230, the conductive structure 220 and a curved portion 210b of the first plate 210. For example, in a portion of the second lateral surface 124 adjacent to the second antenna module 140, the curved portion 230b of the second plate 230 may have a height (or a thickness) H_21, the conductive structure 220 may have a height or a thickness H_22, and the curved portion 210b of the first plate 210 may have a height (or a thickness) H_23. According to an example embodiment, in the portion of the second lateral surface 124 adjacent to the second antenna module 140, H_21>H_22 and H_21>H_23, but the disclosure is not limited thereto.

According to various embodiments, the second antenna module 140 may be disposed adjacent to the second lateral surface 124. The second antenna module 140 may include one type of antenna (e.g., a patch antenna).

According to various embodiments, the second antenna module 140 may be disposed inside the electronic device 101 and may be closer to the second plate 230 than to the first plate 210. The second antenna module 140 may radiate the mmWave signal through the curved portion 230b of the second plate 230.

Figure 7:
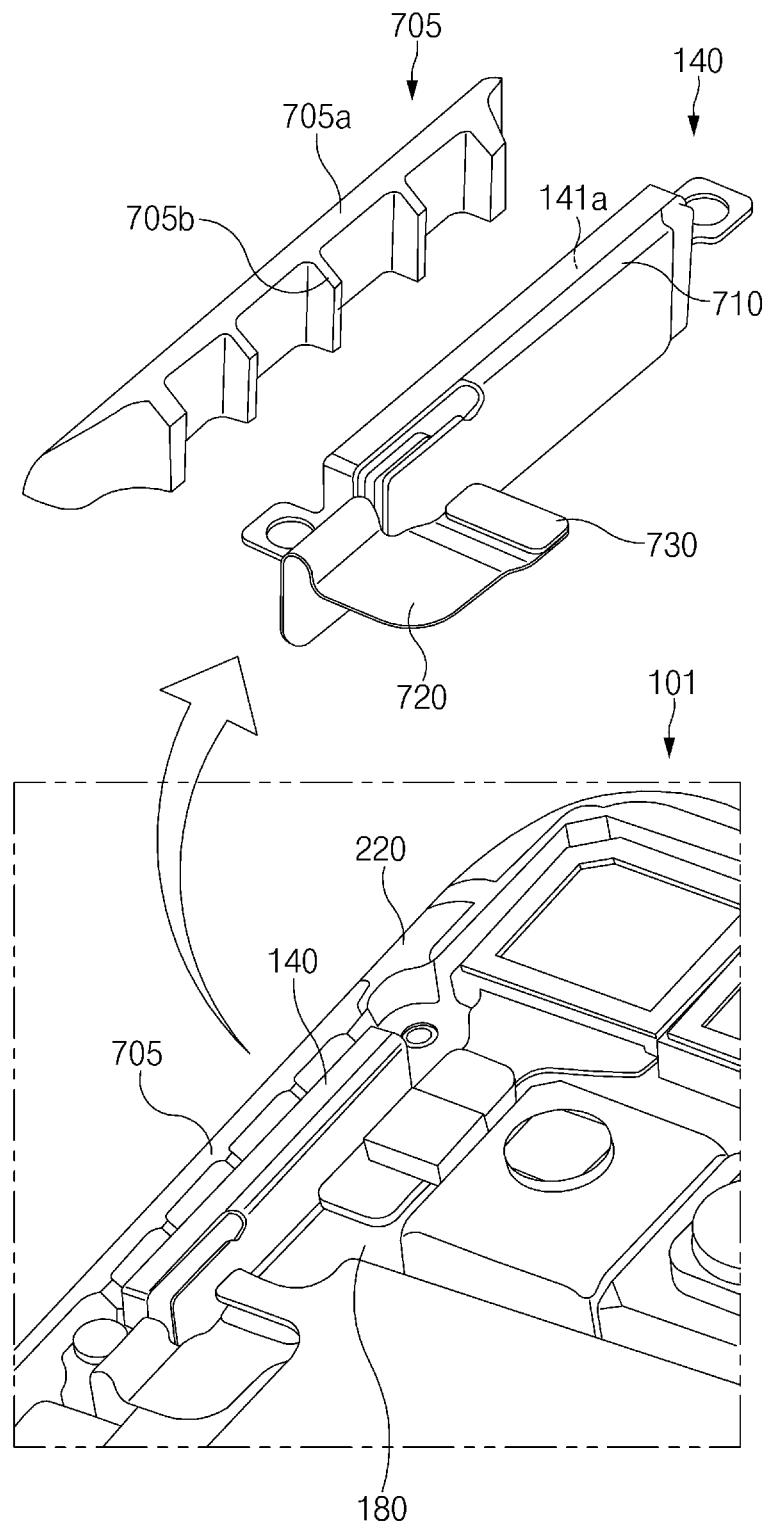
FIG. 7 is a diagram illustrating an example placement mode of a second antenna module according to various embodiments.

FIG. 7 is a diagram illustrating an example placement mode of the second antenna module according to various embodiments. FIG. 7 is illustrative and the disclosure is not limited thereto.

Referring to FIG. 7, in a region adjacent to the second lateral surface 124, the electronic device 101 may include the second antenna module 140, the conductive structure 220, a radiating member (e.g., the PC part) 705, a fixing member 710, a flexible printed circuit board 720, a connector 730, and the main substrate 180.

The second antenna module 140 may include a first type antenna. The first type antenna may be a patch antenna disposed such that a first radiating surface 141a is directed toward the radiating member (or non-conductive member) (e.g., the polycarbonate (PC) part) 705. The first type antenna may radiate the mmWave signal through the radiating member (e.g., the PC part 705).

The conductive structure 220 may form a portion of the lateral surface of the housing 120. The conductive structure 220 may act as an antenna radiator for 4G communication.

The radiating member (e.g., the PC part) 705 may be disposed in contact with an inner surface of the curved portion 230b of the second plate 230. A radiating space (or an air gap) may be defined between the radiating member (e.g., the PC part) 705 and the first radiating surface 141a of the second antenna module 140.

The radiating member (e.g., the PC part) 705 may include a first portion 705a and a second portion 705b. The first portion 705a may have a shape parallel to the first radiating surface 141a. The first portion 705a may be in contact with the inner surface of the curved portion 230b of the second plate 230. The second portion 705b may be disposed between the first portion 705a and the first radiating surface 141a. The second portion 705b may extend in a perpendicular manner to the first portion 705a and may include a plurality of the second portions. A radiating space (or an air gap) may be defined between the second portion 705b and the first radiating surface 141a.

The flexible printed circuit board 720 may be connected to one end of the second antenna module 140. The flexible printed circuit board 720 may transmit a signal which the second antenna module 140 transmits and receives. The connector 730 may electrically connect the flexible printed circuit board 720 and the main substrate 180 with each other.

The components such as a communication circuit, a processor or a memory may be mounted on the main substrate 180 and may be electrically connected to each other via the main substrate 180. The main substrate 180 may be electrically connected to the second antenna module 140 via the flexible printed circuit board 720 and the connector 730.

Figure 8:
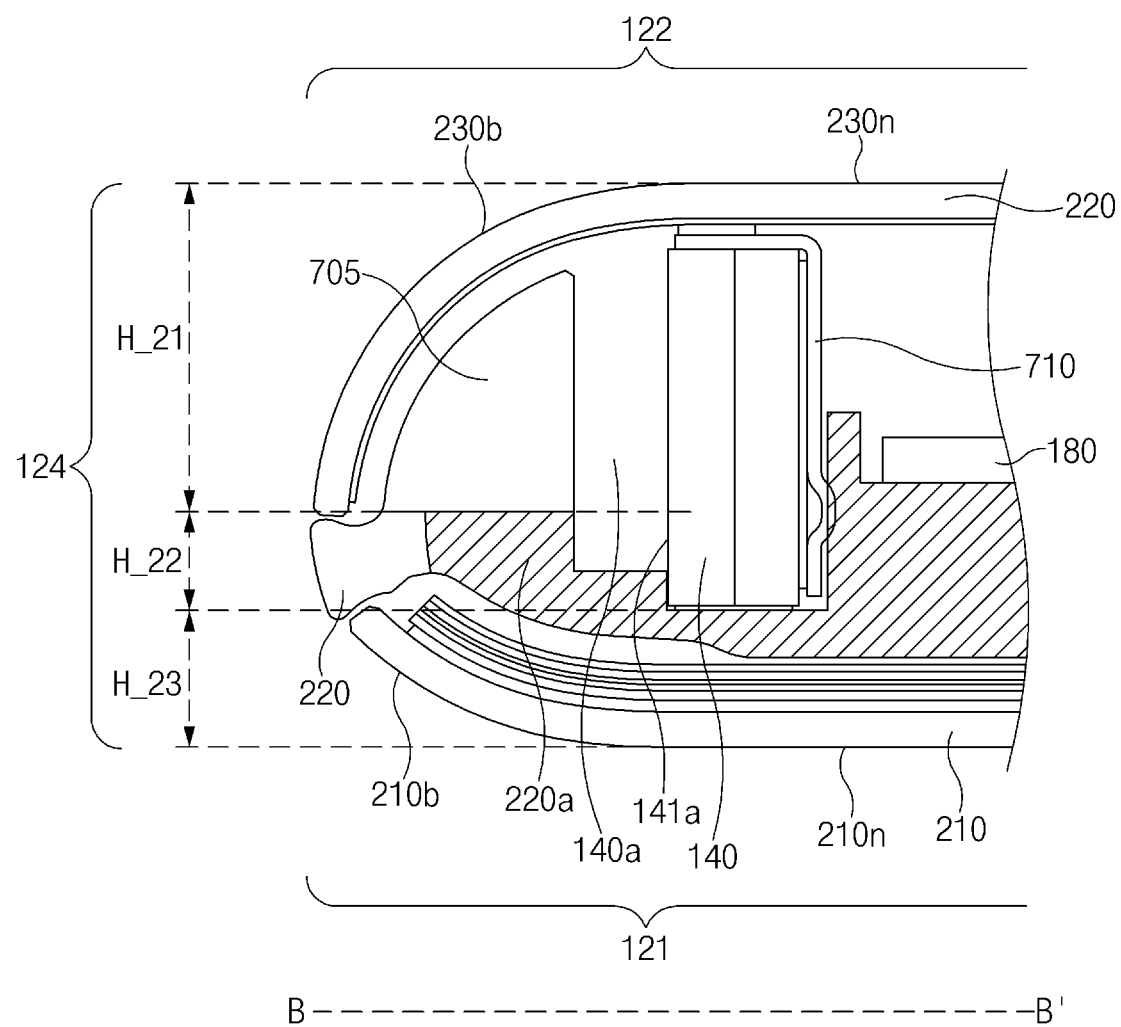
FIG. 8 is a cross-sectional view illustrating a region adjacent to a second antenna module according to various embodiments.

FIG. 8 is a cross-sectional view illustrating an example region adjacent to the second antenna module according to various embodiments. FIG. 8 may be a cross-sectional view of a B-B' direction in FIG. 1. FIG. 8 is illustrative and the disclosure is not limited thereto.

Referring to FIG. 8, in the region adjacent to the second antenna module 140, the electronic device 101 may include the second antenna module 140, the main substrate 180, the first plate 210, the conductive structure 220, the second plate 230, the radiating member (e.g., the PC part) 705, and the fixing member 710.

The second antenna module 140 may have the first radiating surface 141a. The first radiating surface 141a may be a surface from which the first type antenna (e.g., a patch antenna) radiates the mmWave signal. A radiating space (or an air gap) 140a may be defined by the first radiating surface 141a of the second antenna module 140, the second plate 230 and the radiating member (e.g., the PC part) 705. The first type antenna (e.g., a patch antenna) may radiate the mmWave signal through radiating space (or an air gap) 140a.

The main substrate 180 may electrically connect the second antenna module 140 with a communication circuit and a processor.

The first plate 210 may include a non-conductive material (e.g., glass or plastic). The first plate 210 may include a planar portion 210n along and on the first surface 121 of the housing 120. The first plate 210 may at least partially extend to the second lateral surface 124 to define the curved portion 210b. The curved portion 210b of the first plate 210 may have a curved surface shape having a specified curvature.

The conductive structure 220 may form a portion of the second lateral surface 124 of the housing 120. In the region adjacent to the second antenna module 140, a thickness of the conductive structure 220 on the second lateral surface 124 may be smaller than that on the first lateral surface 123 (see, e.g., FIG. 3 and FIG. 4). The conductive structure 220 may be connected to an inner bracket 220a. According to various embodiments, the conductive structure 220 and the inner bracket 220a may include different metal materials. For example, the conductive structure 220 may include stainless steel (SUS), while the inner bracket 220a may include aluminum (Al).

The second plate 230 may include a non-conductive material (e.g., glass or plastic). The second plate 230 may form the planar portion 230n along and on the second surface 122 of the housing 120. The second plate 230 may at least partially extend to the second lateral surface 124 to define the curved portion 230b. The curved portion 230b of the second plate 230 may have a curved surface shape having a specified curvature.

In the second lateral surface 124, the conductive structure 220 may abut, at one end, the curved portion 230b of the second plate 230, and may abut, at the other end, the curved portion 210b of the first plate 210. In the second lateral surface 124, the curved portion 230b of the second plate 230 may be longer than the curved portion 210b of the first plate 210. The conductive structure 220 may be disposed to be closer to the first plate 210 than to the second plate 230.

The second lateral surface 124 may include the curved portion 230b of the second plate 230, the conductive structure 220, and the curved portion 210b of the first plate 210. For example, in the portion of the second lateral surface 124 adjacent to the second antenna module 140, a height (or a thickness) H_21 of the curved portion 230a of the second plate 230 may be greater than a height (or a thickness) H_23 of the curved portion 210b of the first plate 210 or a height (or a thickness) H_22 of the conductive structure 220.

According to various embodiments, the fixing member 710 may be disposed adjacent to the second antenna module 140. The fixing member 710 may fix a shape of the second antenna module 140.

Figure 9:
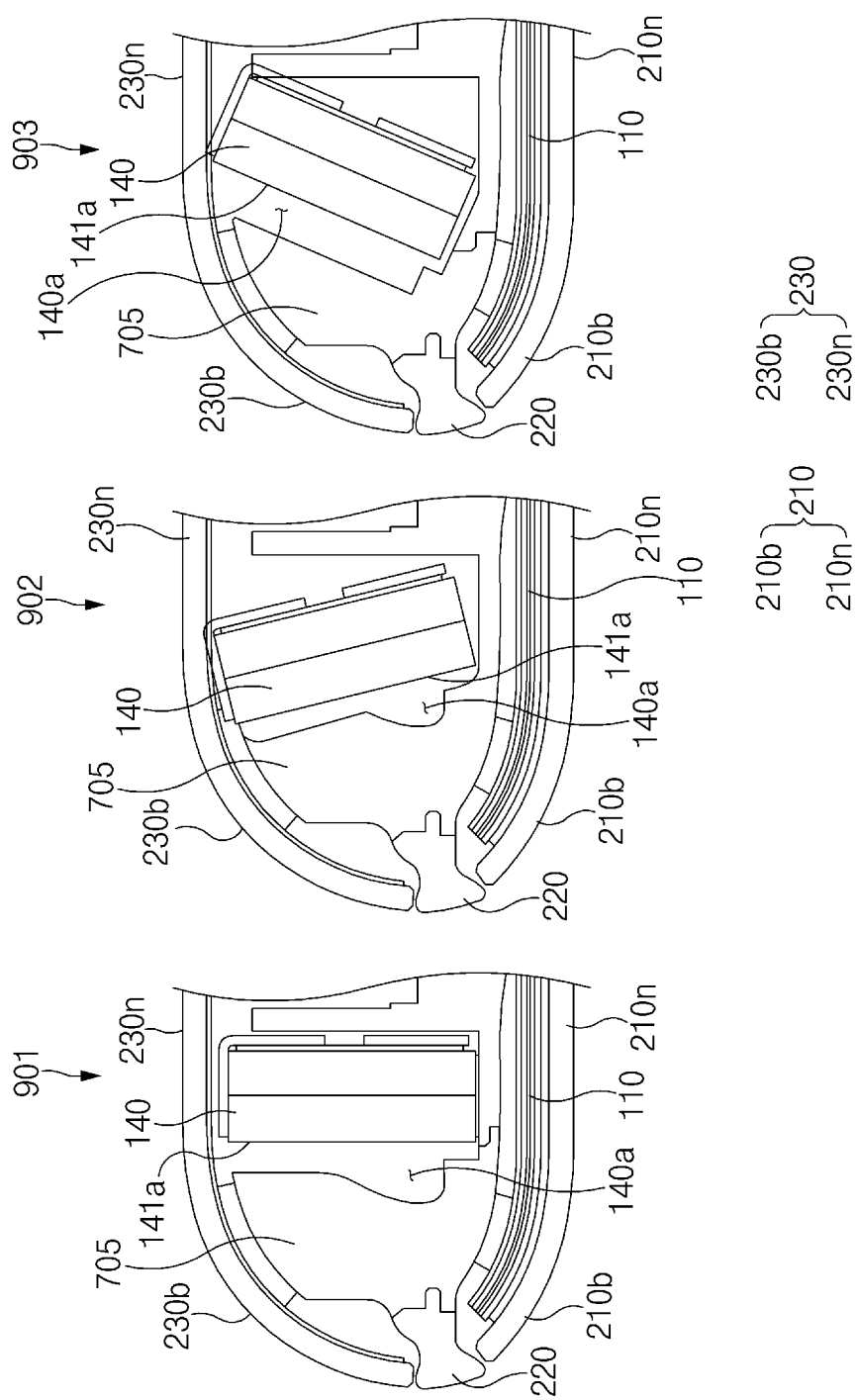
FIG. 9 is a diagram illustrating example placement tilt change of a second antenna module according to various embodiments.

FIG. 9 is a diagram illustrating example placement tilt change of the second antenna module according to various embodiments.

Referring to FIG. 9, in a first placement mode 901, the second antenna module 140 may have the first radiating surface 141a perpendicular to the planar portion 230n of the second plate 230. The first radiating surface 141a may be a surface from which the first type antenna (e.g., a patch antenna) radiates the mmWave signal.

The second antenna module 140 may radiate the mmWave signal through the radiating member (e.g., the PC part) 705 and the curved portion 230b of the second plate 230. The radiating space (or an air gap) 140a may be formed between the radiating member 705 and the first radiating surface 141a of the second antenna module 140.

In a second placement mode 902 or third placement mode 903, the second antenna module 140 may have a tilted first radiating surface 141a that is not perpendicular to the planar portion 230n of the second plate 230. The first radiating surface 141a may be a surface from which the first type antenna (e.g., a patch antenna) radiates the mmWave signal. A shape of the radiating member (e.g., the PC part 705) may vary in a corresponding manner to an inclination angle of the second antenna module 140.

In the second placement mode 902, to improve radiating performance in a direction toward the display 110, the first radiating surface 141a may be tilted toward the conductive structure 220.

In the third placement 903, to improve radiating performance in a direction toward the planar portion 230n of the second plate 230, the first radiating surface 141a may be tilted to be directed toward a location between the planar portion 230n and the curved portion 230a of the second plate 230.

According to various embodiments, features related to the second antenna module 140 of FIGS. 6, 7, 8 and 9 may be equally or similarly applied to the third antenna module 150 of FIG. 1.

Figure 10:
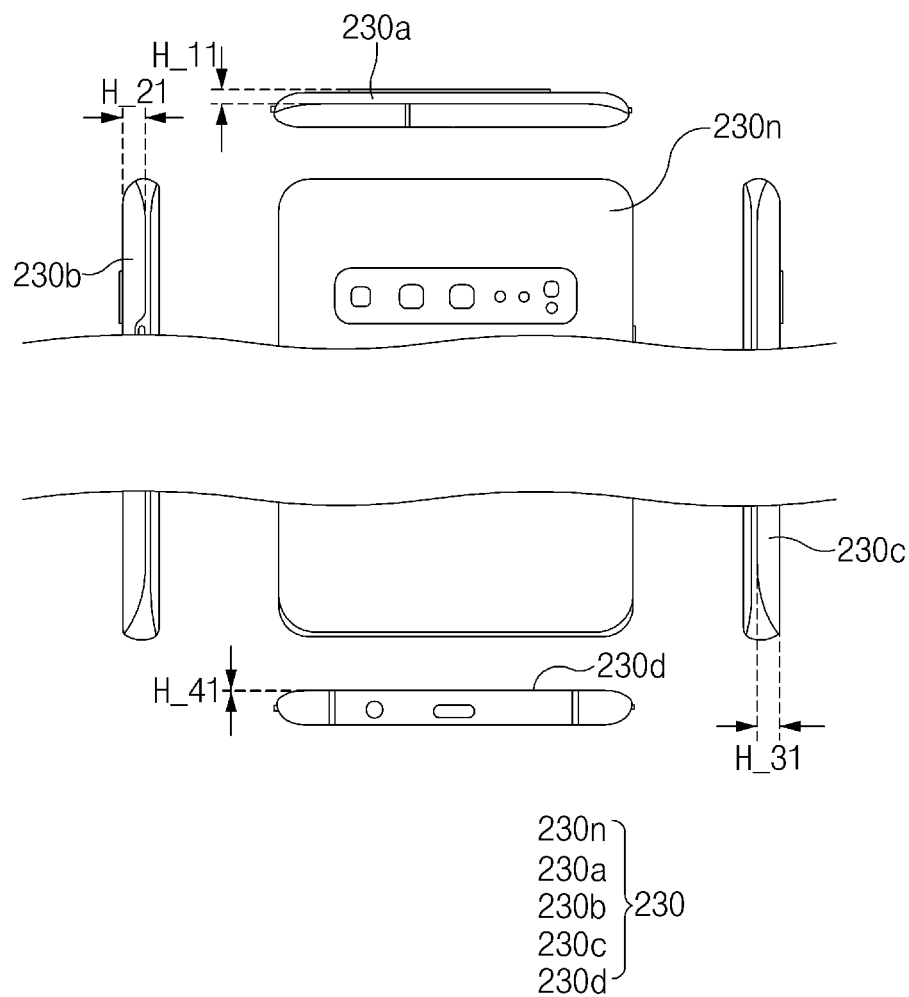
FIG. 10 is a diagram illustrating a height of a curved portion of a second plate at each lateral surface according to various embodiments.

FIG. 10 is a diagram illustrating a height of the curved portion of the second plate in each lateral surface according to various embodiments. FIG. 10 is illustrative and the disclosure is not limited thereto.

Referring to FIG. 10, the second plate 230 may include a non-conductive material (e.g. glass or plastic). The second plate 230 may include the planar portion 230n along and on the second surface 122 of the housing 120. The second plate 230 may at least partially extend to the lateral surface of the housing 120 to define curved portions 230a, 230b, 230c and 230d. Each of the curved portions 230a, 230b, 230c, and 230d may have a curved surface shape having a specified curvature.

The second plate 230 may extend to the first lateral surface (the first lateral surface 123 of FIG. 1) (e.g., a top surface) to define the first curved portion 230a. The first curved portion 230a may have the first height H_11.

The second plate 230 may extend to the second lateral surface (the second lateral surface 124 of FIG. 1) (e.g., a left lateral surface) to define the second curved portion 230b. The second curved portion 230b may have the second height H_21.

The second plate 230 may extend to the third lateral surface (the third lateral surface 125 of FIG. 1) (e.g., a right lateral surface) to define the third curved portion 230c. The third curved portion 230c may have a third height H_31.

The second plate 230 may extend to the fourth lateral surface (the fourth lateral surface 126 of FIG. 1) (e.g., a left lateral surface) to define the fourth curved portion 230d. The fourth curved portion 230d may have a fourth height H_41. According to an example embodiment, when the second plate 230 does not extend to the fourth lateral surface 126, the fourth curved portion 230d may be absent.

According to an example embodiment, the second height H_21 of at least a portion of the second curved portion 230b may be equal to the third height H_31 of at least a portion of the third curved portion 230c. For example, in a portion where a physical button (e.g., a volume button, a power button) is not mounted, the second height H_21 of the second curved portion 230b may be equal to the third height H_31 of the third curved portion 230c.

According to an embodiment, the first height H_11, the second height H_21, the third height H_31, and the fourth height H_41 may, for example, and without limitation, have a relationship: the second height H_21=the third height H_31>the first height H_11.

According to another embodiment, the first height H_11, the second height H_21, the third height H_31, and the fourth height H_41 may, for example, and without limitation, have a relationship: the second height H_21=the third height H_31>the first height H_11=the fourth height H_41. According to still another embodiment, the first height H_11, the second height H_21, the third height H_31, and the fourth height H_41 may, for example, and without limitation, have a relationship: the second height H_21=the third height H_31>the first height H_11>the fourth height H_41.

According to various embodiments, the first height H_11, the second height H_21, the third height H_31, and the fourth height H_41 may be determined based on areas of the radiating surfaces of the antenna modules disposed adjacent to each other. In the first lateral surface 123, the first antenna module 130 for mmWave communication may have a radiating surface parallel to the second surface. In the second lateral surface 124 and third lateral surface 125, each of the second antenna module 140 and third antenna module 150 for mmWave communication may have a radiating surface perpendicular to the second surface. The fourth lateral surface 126 may not include a separate first antenna module 130 for mmWave communication. Accordingly, each of the second height H_21 and third height H_31 may be greater than the first height H_11 or fourth height H_41. The first height H_11 may be greater than the fourth height H_41.

Figure 11:
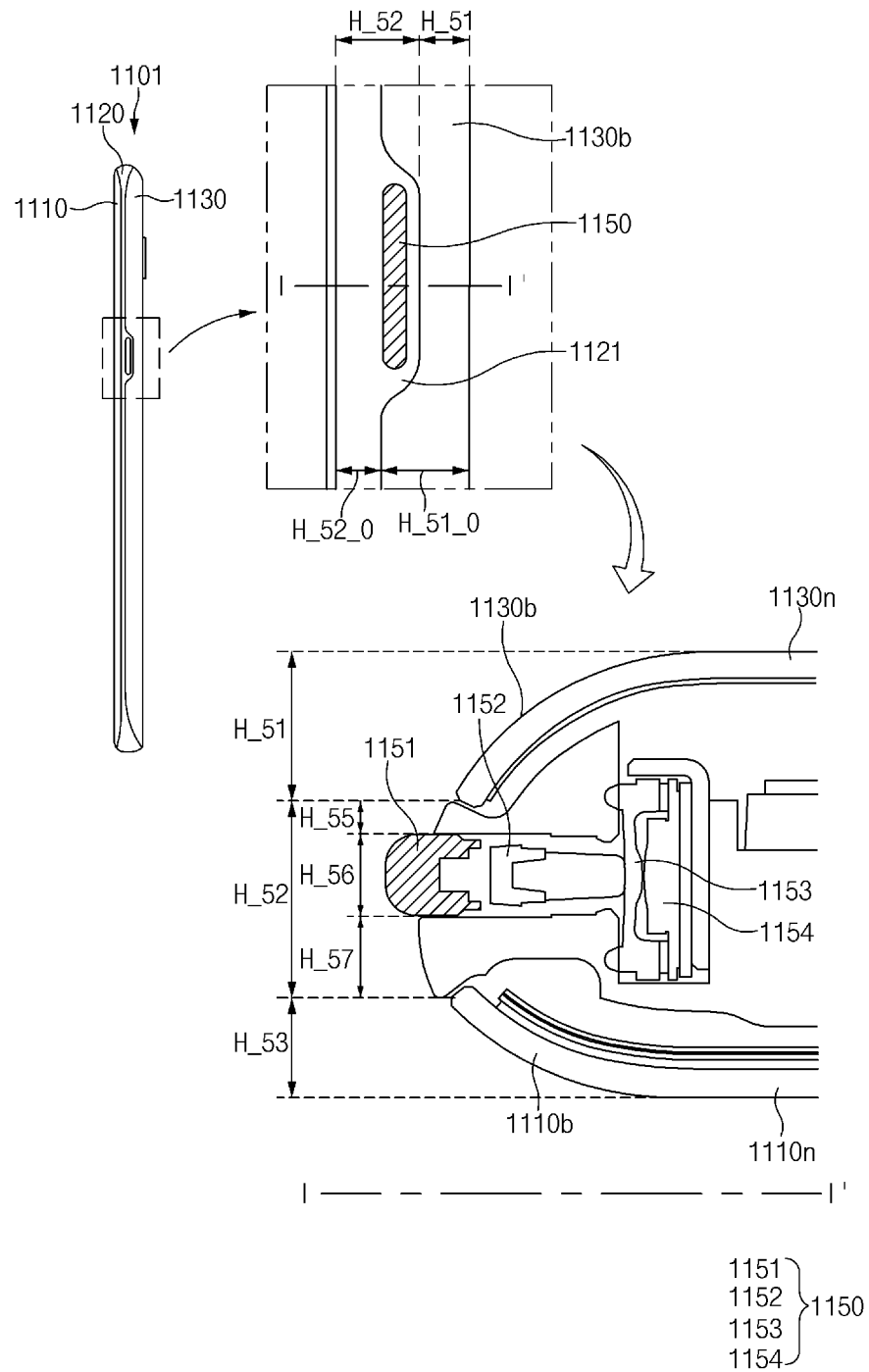
FIG. 11 is a diagram illustrating example mounting of a side key of an electronic device according to various embodiments.

FIG. 11 is a diagram illustrating example mounting of a side key of the electronic device according to various embodiments.

Referring to FIG. 11, an electronic device 1101 may include a first plate 1110, a conductive structure 1120, and a second plate 1130 defining an outer surface thereof.

The first plate 1110 may form the first surface of the electronic device 1101 (a surface on which a main display is mounted). The second plate 1130 may form a second surface opposite to the first surface of the electronic device 1101.

Along and on the lateral surface of the electronic device 1101, the first plate 1110 or second plate 1130 may at least partially extend in a form of a curved surface.

In the lateral surface of the electronic device 1101, the conductive structure 1120 (or a metal housing) may be disposed between a curved portion 1110b of the first plate 1110 and a curved portion 1130b of the second plate 1130.

According to various embodiments, the electronic device 1101 may include a side key 1150 exposed from the lateral surface to an outside. The side key 1150 may be a physical button exposed through the opening formed in the conductive structure 1120.

At a portion of the conductive structure 1120 where the side key 1150 is disposed, the conductive structure 1120 may include an extension 1121 extending toward the second plate 1130. The extension 1121 may allow the curved portion 1130b of the second plate 1130 may to be relatively small in height (or a thickness).

For example, in a portion of the conductive structure 1120 where the side key 1150 is not disposed, the curved portion 1130b of the second plate 1130 may have a first height (or a thickness) H_51_0, and the conductive structure 1120 may have a second height (or a thickness) H_52_0. In a portion of the conductive structure 1120 where the side key 1150 is disposed, the curved portion 1130b of the second plate 1130 may have a third height (or a thickness) H_51 smaller than the first height (or a thickness) H_51_0, and the conductive structure 1120 may have a fourth height (or a thickness) H_52 greater than the second height (or a thickness) H_52_0.

In the cross-sectional view of I-I', in a peripheral region in which the side key 1150 is disposed, the electronic device 1101 may include the first plate 1110, the conductive structure 1120, the second plate 1130, and the side key 1150.

The first plate 1110 may include a non-conductive material (e.g., glass or plastic). The first plate 1110 may include a planar portion 1110n along and on the first surface of the electronic device 1101 (a surface on which the main display is mounted). The first plate 1110 may at least partially extend to the lateral surface of the electronic device 1101 to define the curved portion 1110b. The curved portion 1110b of the first plate 1110 may have a curved surface shape having a specified curvature.

The conductive structure 1120 may form a portion of the lateral surface of the electronic device 1101. The conductive structure 1120 may include the opening through which the side key 1150 is exposed.

The second plate 1130 may include a non-conductive material (e.g., glass or plastic). The second plate 1130 may form a planar portion 1130n along and on the second surface (a rear surface) of the electronic device 1101. The second plate 1130 may at least partially extend to the lateral surface of the electronic device 1101 to define the curved portion 1130b. The curved portion 1130b of the second plate 1130 may have a curved surface shape having a specified curvature.

In a region of the conductive structure where the side key 1150 is disposed, one end of the conductive structure 1120 may be in contact with the curved portion 1130b of the second plate 1130, while the other end thereof may contact the curved portion 1110b of the first plate 1110. The curved portion 1130b of the second plate 1130 may be longer than the curved portion 1110b of the first plate 1110.

The lateral surface of the electronic device 1101 in which the side key 1150 is disposed may include the curved portion 1130b of the second plate 1130, the conductive structure 1120, and the curved portion 1110b of the first plate 1110. For example, a height (or a thickness) H_51 of the curved portion 1130b of the second plate 1130 may be greater than a height (or a thickness) H_53 of the curved portion 1110b of the first plate 1110. A height (or a thickness) H_52 of the conductive structure 1120 may be greater than the height (or a thickness) H_51 of the curved portion 1130b of the second plate 1130 or the height (or a thickness) H_53 of the curved portion 1110b of the first plate 1110.

A height (or a thickness) H_55 of the first portion adjacent to the second plate 1130 of the conductive structure 1120 may be less than a height (or a thickness) H_57 of the second portion adjacent to the first plate 1110. A height (or a thickness) H_56 of the side key 1150 may be greater than the height (or a thickness) H_55 of the first portion.

According to various embodiments, the side key 1150 may include a first movable portion 1151, a second movable portion 1152, an elastic portion 1153, and a button 1154.

The first movable portion 1151 may be a portion exposed to the outside through an opening formed in the conductive structure 1120. The first movable portion 1151 may move inwardly of the electronic device 1101 by an external pressure.

The second movable portion 1152 may be disposed between the first movable portion 1151 and the elastic portion 1153. When the first movable portion 1151 is moved inwardly by the external pressure, the second movable portion 1152 may transmit a force due to the external pressure to the elastic portion 1153.

The elastic portion 1153 may be disposed between the second movable portion 1152 and the button 1154. The elastic portion 1153 may have an elastic force, and may transmit the force transmitted by the second movable portion 1152 to the button 1154 to operate the button 1154.

The button 1154 may be actuated by the force transmitted from the elastic portion 1153. When the button 1154 is actuated by the force transmitted therefrom, the button 1154 may generate an associated electrical signal. The processor inside the electronic device 1101 may execute a related function in response to the electrical signal.

Figure 12:
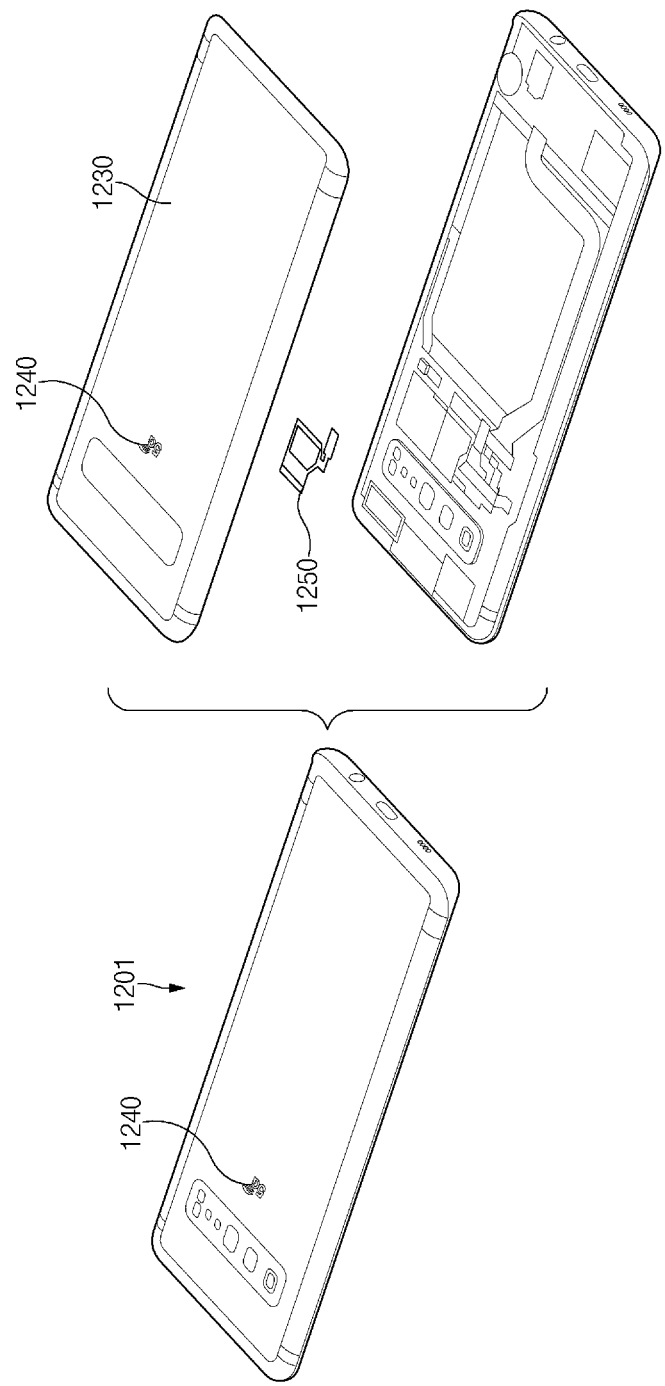
FIG. 12 is a diagram illustrating example mounting of a light-emission element associated with an antenna operation according to various embodiments.

FIG. 12 is a diagram illustrating example mounting of a light-emission element associated with an antenna operation according to various embodiments.

Referring to FIG. 12, an electronic device 1201 may include a light-emission element 1250 inside the housing. A rear plate 1230 of the electronic device 1201 may include a transmissive portion 1240 that transmits at least a portion of the light emitted from the light-emission element 1250.

According to various embodiments, the light-emission element 1250 may operate in conjunction with an operation of the antenna module (e.g., a mmWave antenna) inside the electronic device 1201. For example, the light-emission element 1250 may be turned on when the antenna module transmits and receives the mmWave signal according to a 5G communication protocol. The light-emission element 1250 may be turned off when the antenna module transmits and receives an RF signal according a legacy 4G communication protocol.

Figure 13:
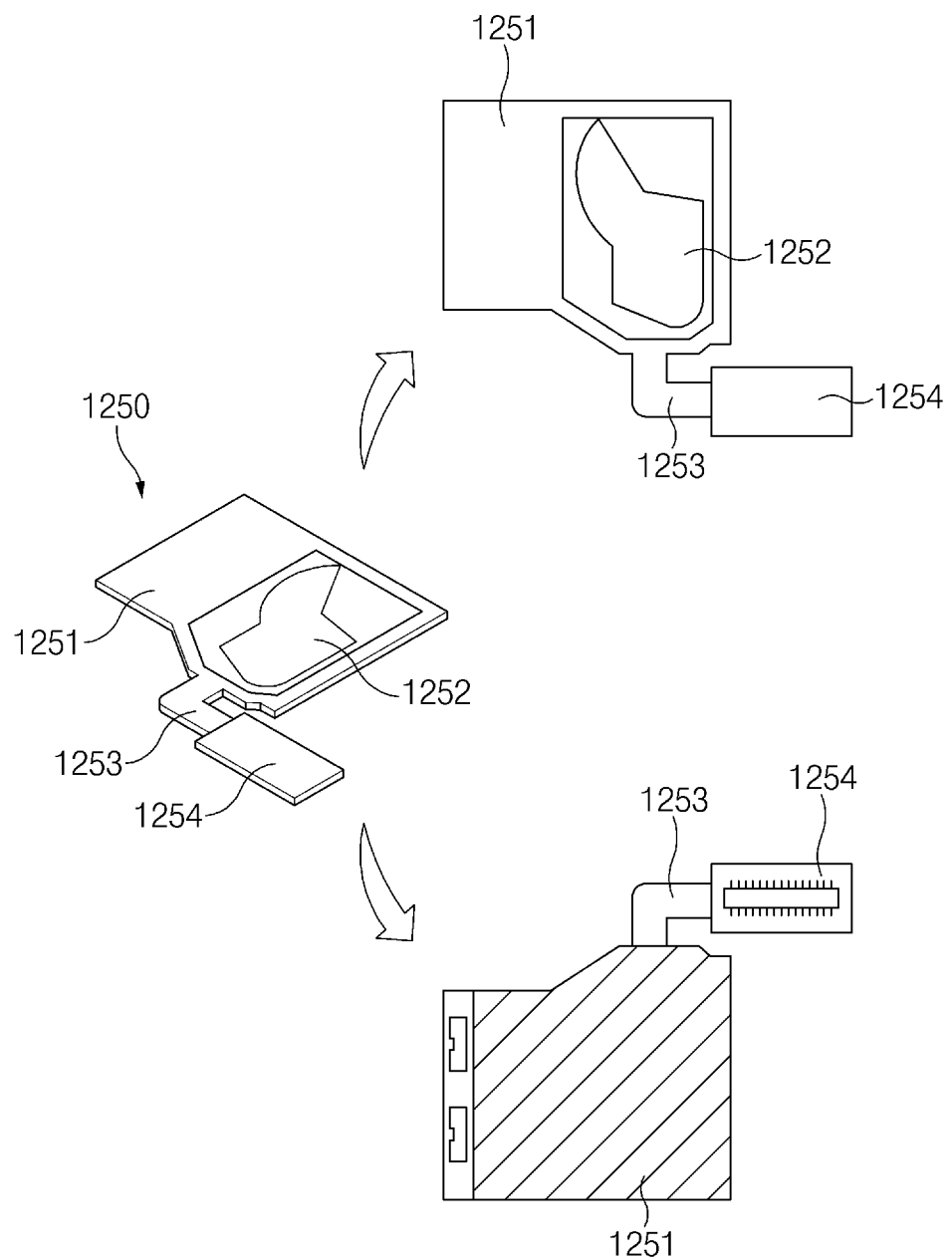
FIG. 13 is a diagram illustrating an example light-emission element according to various embodiments.

FIG. 13 is a diagram illustrating an example light-emission element according to various embodiments.

Referring to FIG. 13, the light-emission element 1250 may include a substrate 1251, a light-emitter (e.g., including a light emitting diode) 1252, a flexible printed circuit board (or conductive wire) 1253, and a connector 1254.

On the substrate 1251, the light-emitter (e.g., LED) 1252 may be mounted which may be electrically connected thereto. The light-emitter 1252 may generate light under a control signal of an internal processor of the electronic device 1201. The flexible printed circuit board (or a conductive wire) 1253 may transmit a control signal related to the operation of the light-emitter 1252. The connector 1254 may electrically connect the flexible printed circuit board 1253 to the main substrate inside the electronic device 1201.

Figure 14:
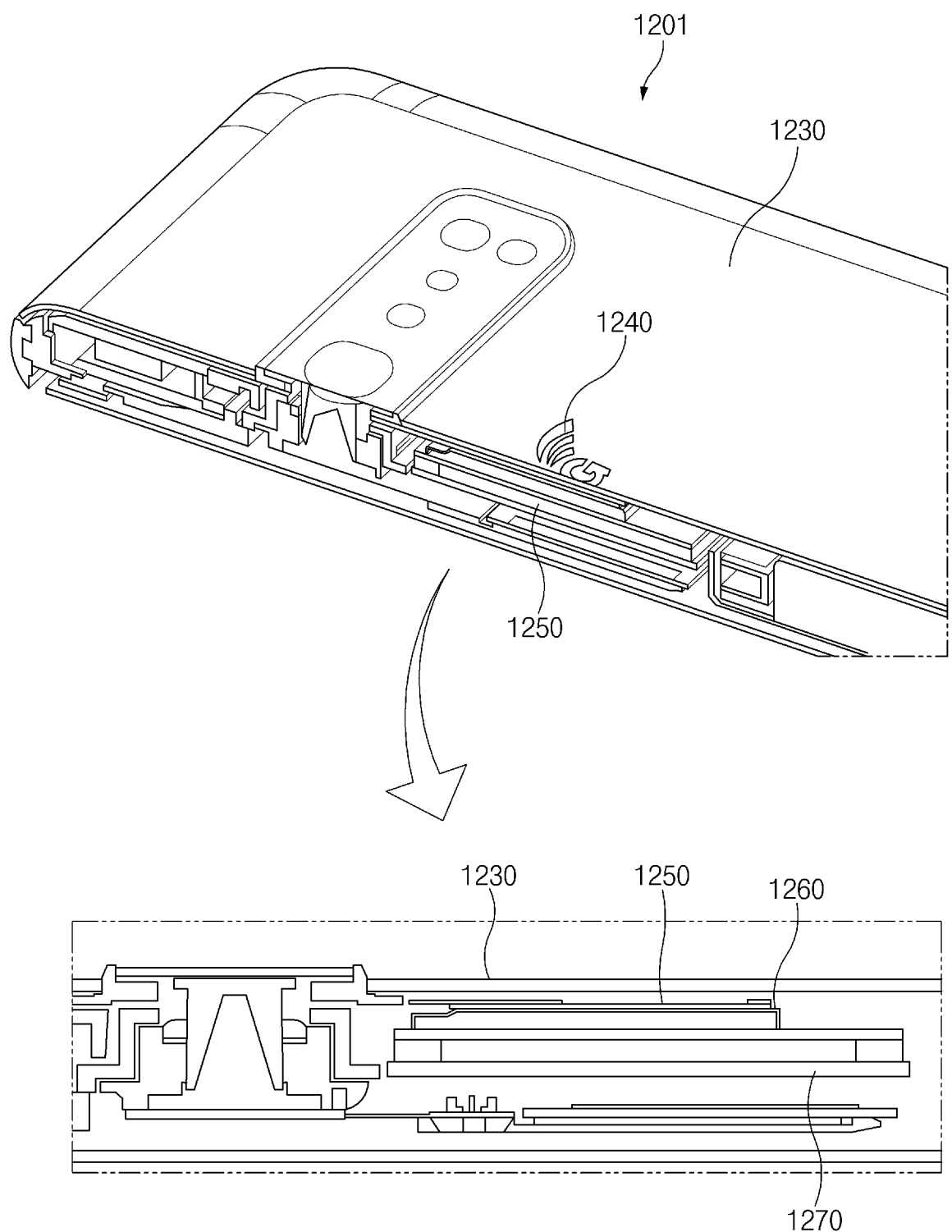
FIG. 14 is a cross-sectional view illustrating an example electronic device having a light-emission element mounted thereon according to various embodiments.

FIG. 14 is a cross-sectional view illustrating an example electronic device having a light-emission element mounted thereon according to various embodiments.

Referring to FIG. 14, the light-emission element 1250 may be disposed between the rear plate 1230 and a shield can 1260 of the electronic device 1201. A waveguide for transmitting light may be formed between the light-emission element 1250 and the plate 1230.

The shield can 1260 may block light or heat generated from the light-emission element 1250 to prevent and/or reduce affecting the surrounding elements.

Figure 15:
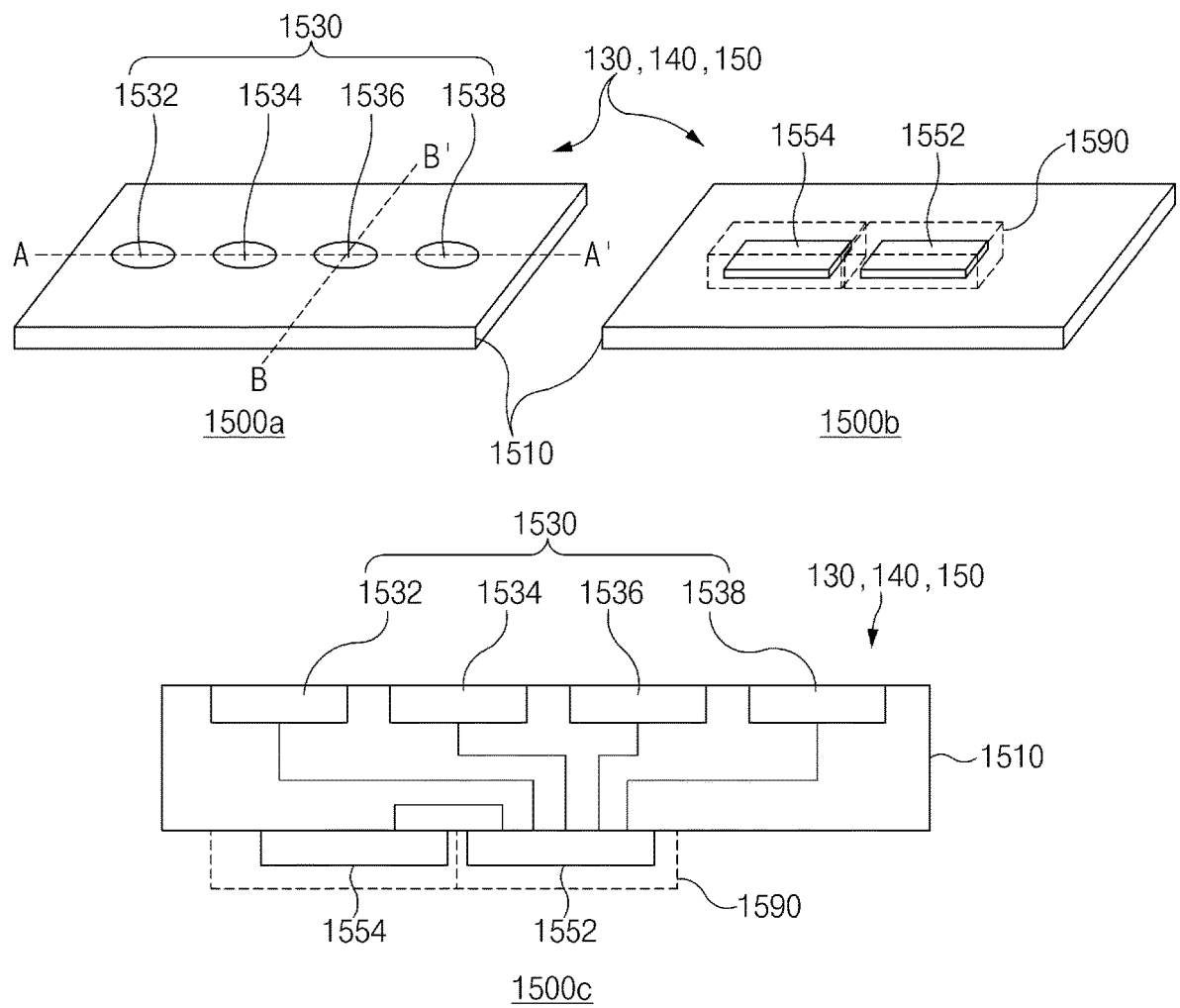
FIG. 15 is a diagram illustrating example structures of first, second and third antenna modules according to various embodiments.

FIG. 15 illustrates an example embodiment of structures of the first to third antenna modules 130, 140, and 150 as described with reference to FIG. 1 in one example. 1500a of FIG. 15 is a perspective view of the first to third antenna modules 130, 140, and 150 from one side. 1500b of FIG. 15 is a perspective view of the first to third antenna modules 130, 140, and 150 viewed from an opposite side. 1500c in FIG. 15 is a cross-sectional view taken across a line A-A' of the first to third antenna modules 130, 140 and 150.

Referring to FIG. 15, in an example embodiment, each of the first to third antenna module 130, 140 and 150 may include a printed circuit board 1510, an antenna array 1530, RFIC (a radio frequency integrated circuit) 1552, PMIC (a power manage integrated circuit) 1554, and a module interface (not shown). Optionally, each of the first to third antenna modules 130, 140, and 150 may further include a shielding member 1590. In other embodiments, at least one of the mentioned components may be omitted, or at least two of the components may be integrally formed with each other.

The printed circuit board 1510 may include multiple of conductive layers, and multiple of non-conductive layers alternately stacked with the conductive layers. The printed circuit board 1510 may provide electrical connections between the printed circuit board 1510 and/or various electronic parts disposed externally using wires and conductive vias formed in the conductive layers.

The antenna array 1530 may include a plurality of antenna elements 1532, 1534, 1536, or 1538 arranged to define a directional beam. The antenna elements may be formed on a first surface of the printed circuit board 1510 as shown. According to another embodiment, the antenna array 1530 may be formed within the printed circuit board 1510. According to embodiments, the antenna array 1530 may include the plurality of antenna arrays (e.g., a dipole antenna array, and/or a patch antenna array) of the same or different shape or type.

RFIC 1552 may be disposed in another region (the second surface opposite to the first surface) of the printed circuit board 1510 spaced apart from the antenna array 1530. The RFIC 1552 may be configured to process a signal of a selected frequency band as transmitted/received through the antenna array 1530. According to an embodiment, the RFIC 1552 may convert a baseband signal obtained from a communication processor (not shown) into an RF signal of a specified band in a transmitting process. The RFIC 1552, in a reception process, may convert the RF signal received through the antenna array 1530 into a baseband signal and transmit the baseband signal to the communication processor.

According to another embodiment, in a transmitting process, the RFIC 1552 may up-convert an IF signal (e.g., about 9 GHz to about 11 GHz) obtained from IFIC (an intermediate frequency integrated circuit) to an RF signal of a selected band. The RFIC 1552, in a reception process, may down-convert the RF signal obtained through the antenna array 1530 into an IF signal, and deliver the IF signal to the IFIC.

The PMIC 1554 may be disposed on another portion (e.g., the second surface) of the printed circuit board 1510 as spaced apart from the antenna array. The PMIC 1554 may be supplied with a voltage from a main PCB (not shown) to provide power to various parts on the antenna module, for example, RFIC 1552.

The shielding member 1590 may be disposed on a portion (e.g., the second surface) of the printed circuit board 1510 to electromagnetically shield at least one of RFIC 1552 or PMIC 1554. According to an embodiment, the shielding member 1590 may include a shield can.

Although not shown, in various embodiments, the first to third antenna module 130, 140, and 150 may be electrically connected to another printed circuit board (e.g., a main circuit substrate) via the module interface. The module interface may include a connection member (e.g., a coaxial cable connector, a board to board connector, an interposer, or a flexible printed circuit board (FPCB)). Via the connection member, RFIC 1552 and/or PMIC 1554 of the first to third antenna modules 130, 140, and 150 may be electrically connected to the printed circuit board.

Figure 16:
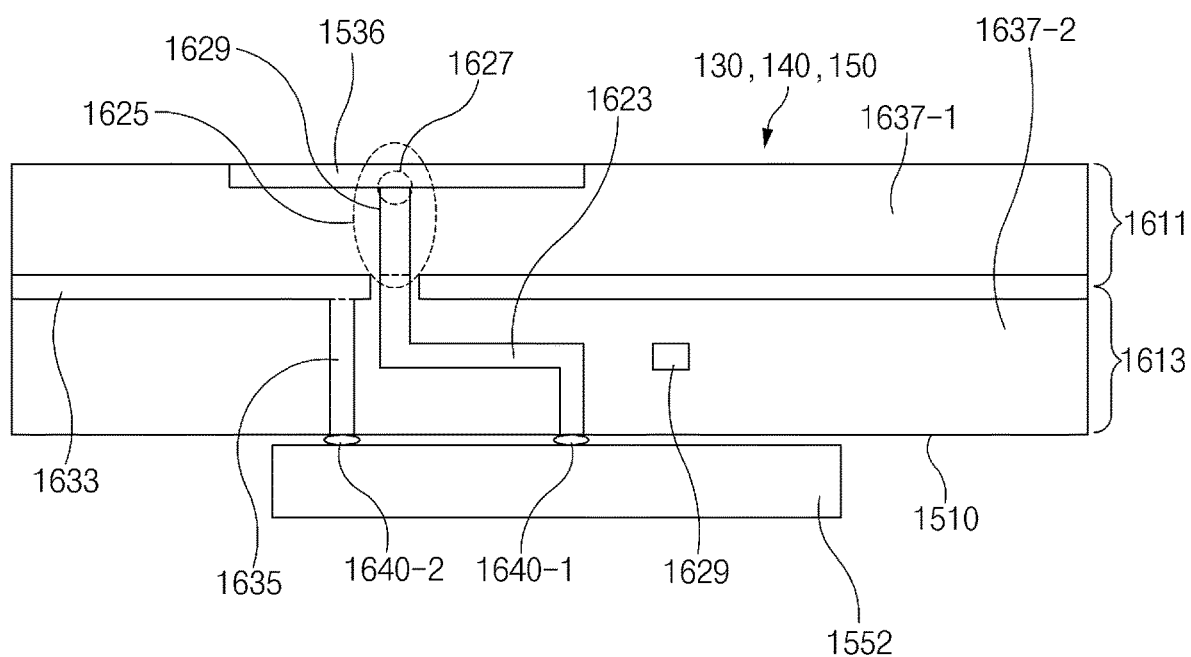
FIG. 16 is a cross-sectional view illustrating the first to third antenna modules of FIG. 15 according to various embodiments.

FIG. 16 is a cross section taken across a line B-B" of each of the first to third antenna modules 130, 140 and 150 of 1500a of FIG. 15. The printed circuit board 1510 of the illustrated embodiment may include an antenna layer 1611 and a network layer 1613.

The antenna layer 1611 may include at least one dielectric layer 1637-1, and an antenna element 1536 and/or electrical feed 1625 formed on an outer surface of the dielectric layer or therein. The electrical feed 1625 may include an electrical feed point 1627 and/or an electrical feed line 1629.

The network layer 1613 includes at least one dielectric layer 1637-2, and at least one ground layer 1633, at least one conductive via 1635, a transmission line 1623, and/or a signal line 1629 formed on an outer surface of the dielectric layer or therein.

In addition, in the illustrated embodiment, RFIC 1552 of 1500c of FIG. 15 may be electrically connected to the network layer 1613 via, for example, first and second connectors (solder bumps 1640-1, 1640-2). In other embodiments, various connection structures such as soldering or BGA may be used instead of the connector. The RFIC 1552 may be electrically connected to the antenna element 1536 via the first connector 1640-1, the transmission line 1623, and the electrical feed 1625. RFIC 1552 may be electrically connected to the ground layer 1633 via the second connector 1640-2, and the conductive via 1635. Although not shown, RFIC 1552 may be electrically connected to the above-mentioned module interface via the signal line 1629.

Figure 17:
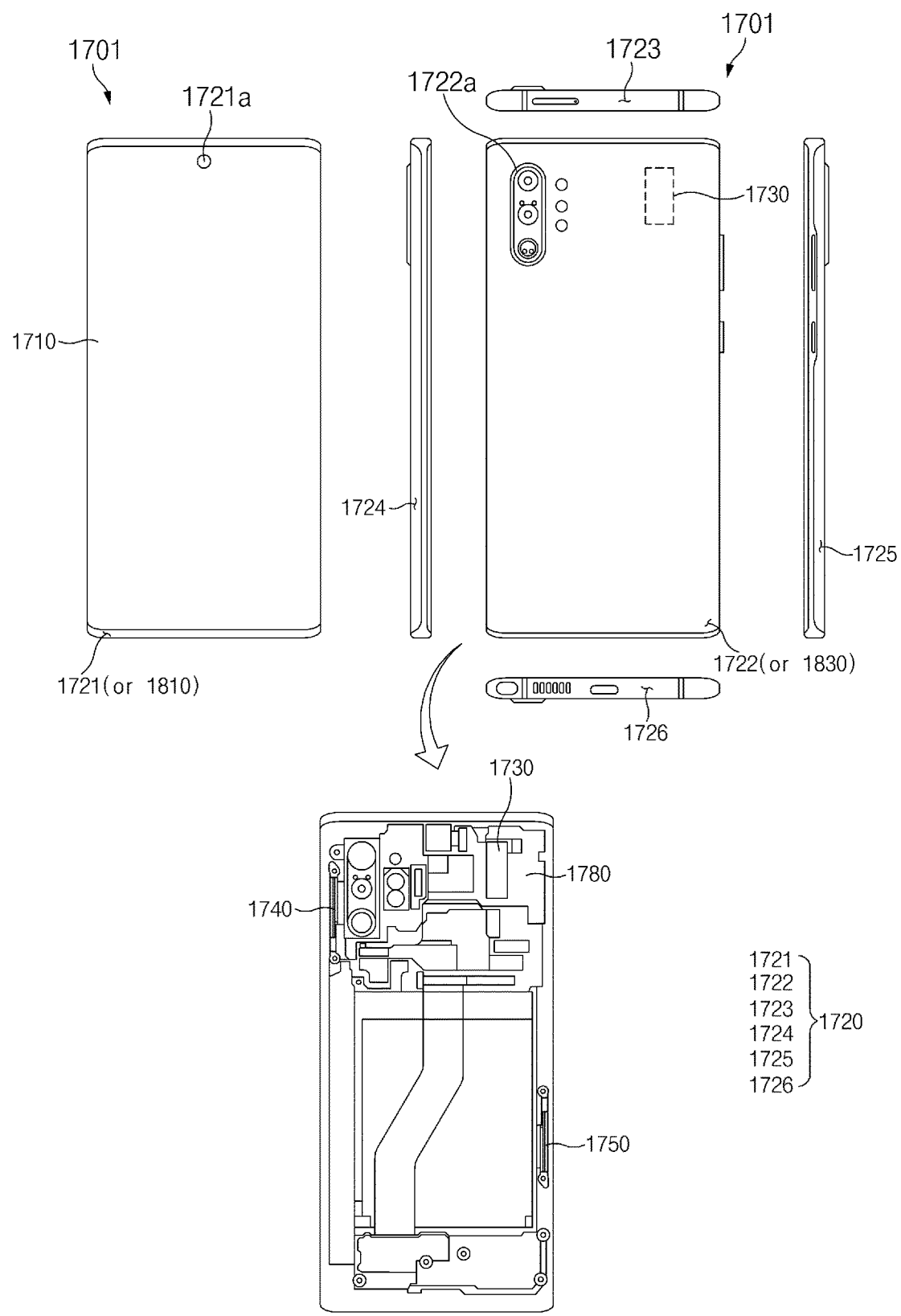
FIG. 17 is a diagram illustrating an example electronic device according to various embodiments.

FIG. 17 is a diagram illustrating an example electronic device according to various embodiments.

Referring to FIG. 17, an electronic device 1701 may include a display 1710 and a housing 1720.

The display 1710 may display various contents such as a text or an image. The display 1710 may be exposed through a first surface 1721 of the housing 1720. The display 1710 may occupy most of the first surface 1721. The display 1710 may have a structure in which a plurality of layers including a display panel and a touch panel are stacked.

The housing 1720 may include the first surface 1721, a second surface 1722, a first lateral surface 1723, a second lateral surface 1724, a third lateral surface 1725, and a fourth lateral surface 1726.

The first surface 1721 may be a surface through which the display 1710 is viewable. The most of the first surface 1721 may be defined as an active region of display 1710.

According to various embodiments, the first surface 1721 may be embodied as one plate 1810 (see, e.g., FIG. 18, hereinafter, a first plate 1810) (or a first glass panel). The first plate 1810 may include a non-conductive material (e.g. glass, plastic). For example, the first plate 1810 may be a glass panel or glass cover that covers the display panel. According to an embodiment, the first plate 1810 may include an inorganic oxide (e.g., glass, ceramic, sapphire).

According to various embodiments, the first plate 1810 may be planar along and on the first surface 1721 and may at least partially extend to the second lateral surface 1724 or third lateral surface 1725. The portion thereof extending to the second lateral surface 1724 or third lateral surface 1725 may have a curved surface shape with a specified curvature.

According to various embodiments, the first plate 1810 may include a hole 1721*a* defined in at least a portion thereof for exposing a sensor or a front camera to an outside.

According to various embodiments, the second surface 1722 may be a surface opposite to the first surface 1721. The second surface 1722 may be a surface through which the display 1710 is not exposed.

According to various embodiments, the second surface 1722 may be implemented as one plate 1830 (see, e.g., FIG. 18, hereinafter, a second plate 1830) (or a second glass panel). The second plate 1830 may include a non-conductive material (e.g. glass or plastic). The second plate 1830 may included the same material as the first plate 1810. The second plate 1830 may include inorganic oxide (e.g. glass, ceramic, sapphire).

The second plate 1830 may be planar along and on the second surface 1722 and may at least partially extend to the second lateral surface 1724 or third lateral surface 1725. The portion thereof extending to the second lateral surface 1724 or the third lateral surface 1725 may have a curved surface shape with a specified curvature.

According to various embodiments, the second plate 1830 may include a hole 1722*a* defined at least a portion thereof for exposing a sensor or a rear camera.

The second lateral surface 1724 (e.g., a left lateral surface) or the third lateral surface 1725 (e.g., a right lateral surface) may include at least a portion of the curved portion of the first plate 1810, the curved portion of the second plate 1830, or a conductive structure (e.g., a metal housing).

According to various embodiments, the housing 1720 may include various components necessary for driving the electronic device 1701 therein. For example, the housing 1720 may include a main substrate 1780 therein. On the main substrate 1780, a variety of components such as a processor, memory, and communication circuit, mounted inside the housing 1720 may be mounted. Further, the housing 1720 may include various components such as batteries, sensors, camera modules, speakers or connectors therein.

According to various embodiments, the electronic device 1701 may include a plurality of antenna modules 1730, 1740, and 1750 in the housing 1720. Each antenna module may transmit and receive a signal of a specified frequency band.

According to various embodiments, the plurality of antenna modules 1730, 1740, and 1750 may transmit and receive a millimeter-wave or mmWave signal according to 5G communication protocol. The millimeter wave may be an ultra-high frequency of about 6 to 300 GHz. The millimeter wave may increase transmission/reception efficiency using a beamforming technique of multiple antennas. The plurality of antenna modules 1730, 1740 and 1750 may transmit a millimeter wave signal in a specified direction via beamforming technology. The plurality of antenna modules 1730, 1740, and 1750 may be disposed in the housing 1720 in various forms to smoothly transmit and receive an RF signal in six plane directions of the electronic device 1701.

According to an example embodiment, the plurality of antenna modules 1730, 1740, and 1750 may include the first antenna module 1730, the second antenna module 1740, and the third antenna module 1750.

The first antenna module 1730 may be disposed adjacent to the first lateral surface 1723. The first antenna module 1730 may include two different types of antennas (e.g., a patch antenna and a dipole antenna). The first antenna module 1730 may radiate a signal to the second surface 1722 or third lateral surface 1725 of the electronic device 1701.

The second antenna module 1740 may be disposed adjacent to the second lateral surface 1724. For example, the second antenna module 1740 may be disposed in a middle of the second lateral surface 1724 or in a region adjacent a corner between the first lateral surface 1723 and the second lateral surface 1724. In an example embodiment, the second antenna module 1740 may include one type of antenna (e.g., a patch antenna). The second antenna module 1740 may radiate the signal to the first surface 1721, the second surface 1722, or the second lateral surface 1724 of the electronic device 1701. In another embodiment, the second antenna module 1740 may include a first type antenna and a second type antenna. For example, the first type antenna may be a patch antenna. The second type antenna may be a dipole antenna.

The third antenna module 1750 may be disposed adjacent to the third lateral surface 1725. For example, the third antenna module 1750 may be located in a middle of the third lateral surface 1725 or in a region adjacent a corner between the third lateral surface 1725 and the fourth lateral surface 1726. In an example embodiment, the third antenna module 1750 may include one type of antenna (e.g., a patch antenna). The third antenna module 1750 may radiate the signal to the first surface 1721, the second surface 1722, or the third lateral surface 1725 of the electronic device 1701. In another embodiment, the third antenna module 1750 may include a first type antenna and a second type antenna.

The configurations or features of the second antenna module 1740 and the third antenna module 1750 may be the same as or similar to those of the second antenna module 140 and the third antenna module 150 in FIGS. 6, 7, 8 and 9.

Figure 18:
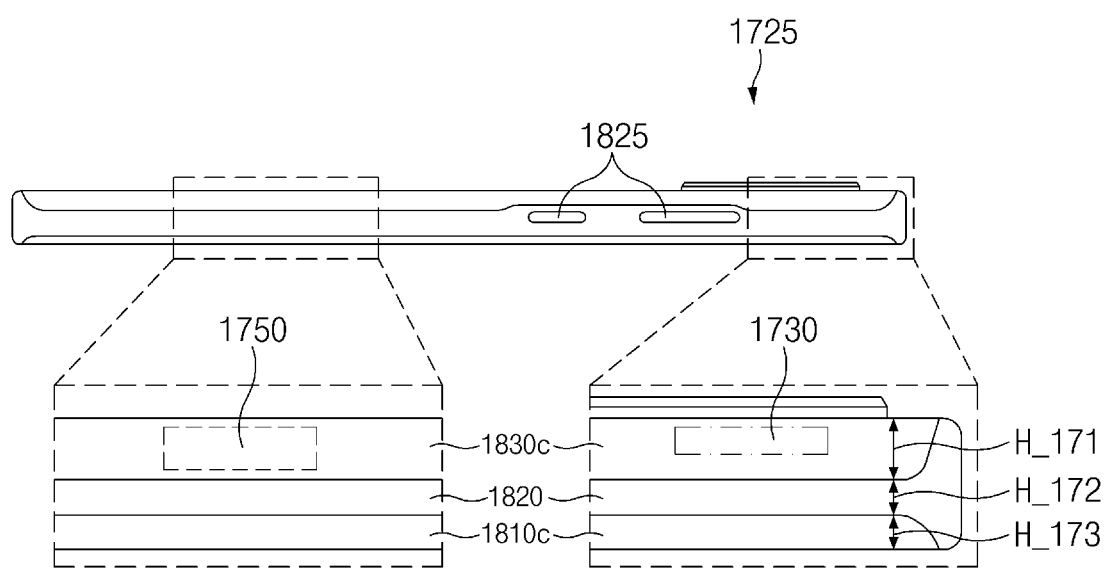
FIG. 18 is a diagram illustrating example placements of a first antenna module and a third antenna module on a third lateral surface according to various embodiments.

FIG. 18 is a diagram illustrating example placements of the first antenna module and the third antenna module on the third lateral surface according to various embodiments.

Referring to FIG. 18, the third lateral surface 1725 may include a curved portion 1830c of the second plate 1830, a conductive structure 1820, and a curved portion 1810c of the first plate 1810.

For example, in a portion of the third lateral surface 1725 adjacent to the first antenna module 1730, a height (or a thickness) H_171 of the curved portion 1830c of the second plate 1830 may be equal to or greater than a height (or a thickness) H_172 of the conductive structure 1820. The height H_171 of the curved portion 1830c of the second plate 1830 may be equal to or greater than a height (or a thickness) H_173 of curved portion 1810c of the first plate 1810.

According to various embodiments, the conductive structure 1820 may include an opening through which a button 1825 may be exposed.

According to various embodiments, the first antenna module 1730 may be disposed adjacent to a corner between the first lateral surface (the first lateral surface 1723 of FIG. 17) and the third lateral surface 1725. The first antenna module 1730 may include two different types of antennas (e.g., a patch antenna and dipole antenna).

According to various embodiments, the first antenna module 1730 may be closer to the second plate 1830 than to the first plate 1810 in the electronic device 1701. The first antenna module 1730 may radiate the mmWave signal through the second plate 1830 or the curved portion 1830c of the second plate 1830.

According to various embodiments, the third antenna module 1750 may be disposed adjacent to a center or a bottom of the third lateral surface 1725 (region adjacent to the fourth lateral surface 1726 of FIG. 17). In an example embodiment, the third antenna module 1750 may include one type of antenna (e.g., a patch antenna). The third antenna module 1750 may radiate the signal to the first surface 1721, the second surface 1722, or the third lateral surface 1725 of the electronic device 1701.

According to various embodiments, the first antenna module 1730 may be disposed in a first direction of the button 1825. The third antenna module 1750 may be disposed in a second direction (opposite to the first direction) of the button 1825.

Figure 19:
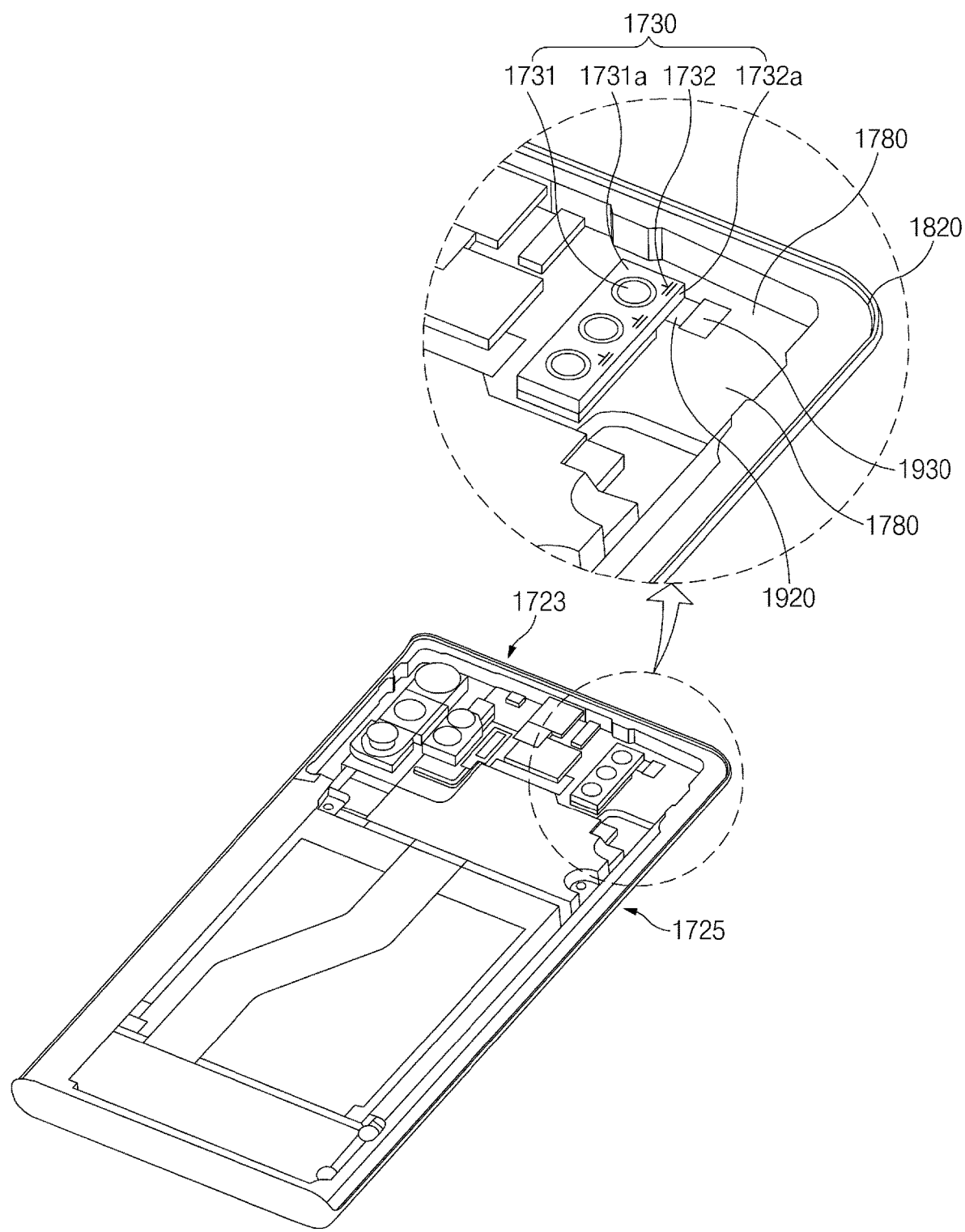
FIG. 19 is a diagram illustrating an example placement mode of a first antenna module according to various embodiments.

FIG. 19 is a diagram illustrating an example placement mode of the first antenna module according to various embodiments. FIG. 19 is illustrative and the disclosure is not limited thereto.

Referring to FIG. 19, in a region adjacent to the first lateral surface 1723 and the third lateral surface 1725, the electronic device 1701 may include the conductive structure 1820, the first antenna module 1730, a flexible printed circuit board 1920, a connector 1930, and the main substrate 1780.

The conductive structure 1820 may form a portion of the lateral surface of the housing 1720. The conductive structure 1820 may be used as an antenna radiator for transmitting and receiving a signal of a specified frequency band. For example, the conductive structure 1820 may act as an antenna radiator for signals for 4G or 3G communication (e.g., 6 GHz or lower).

According to various embodiments, the first antenna module 1730 may include a first type antenna 1731 (e.g., a patch antenna) and a second type antenna 1732 (e.g., a dipole antenna).

The first type antenna 1731 may be a patch antenna disposed such that the first radiating surface or patch surface 1731a is directed toward the second plate 1830. The first type antenna 1731 may radiate an mmWave signal through the second plate 1830.

The second type antenna 1732 may be a dipole antenna disposed so that the second radiating surface 1732a is directed toward the third lateral surface 1725. The second type antenna 1732 may radiate the mmWave signal through the second plate 1830 or the curved portion 1830c (refer to FIG. 18) of the second plate 1830.

The flexible printed circuit board 1920 may transmit a signal transmitted and received by the first antenna module 1730. The connector 1930 may electrically connect the flexible printed circuit board 1920 and the main substrate 1780 with each other.

Elements such as a communication circuit, processor or memory may be mounted on the main substrate 1780, and electrically connected with each other via the main substrate 1780. The main substrate 1780 may be electrically connected to the first antenna module 1730 via the flexible printed circuit board 1920 and connector 1930.

Figure 20:
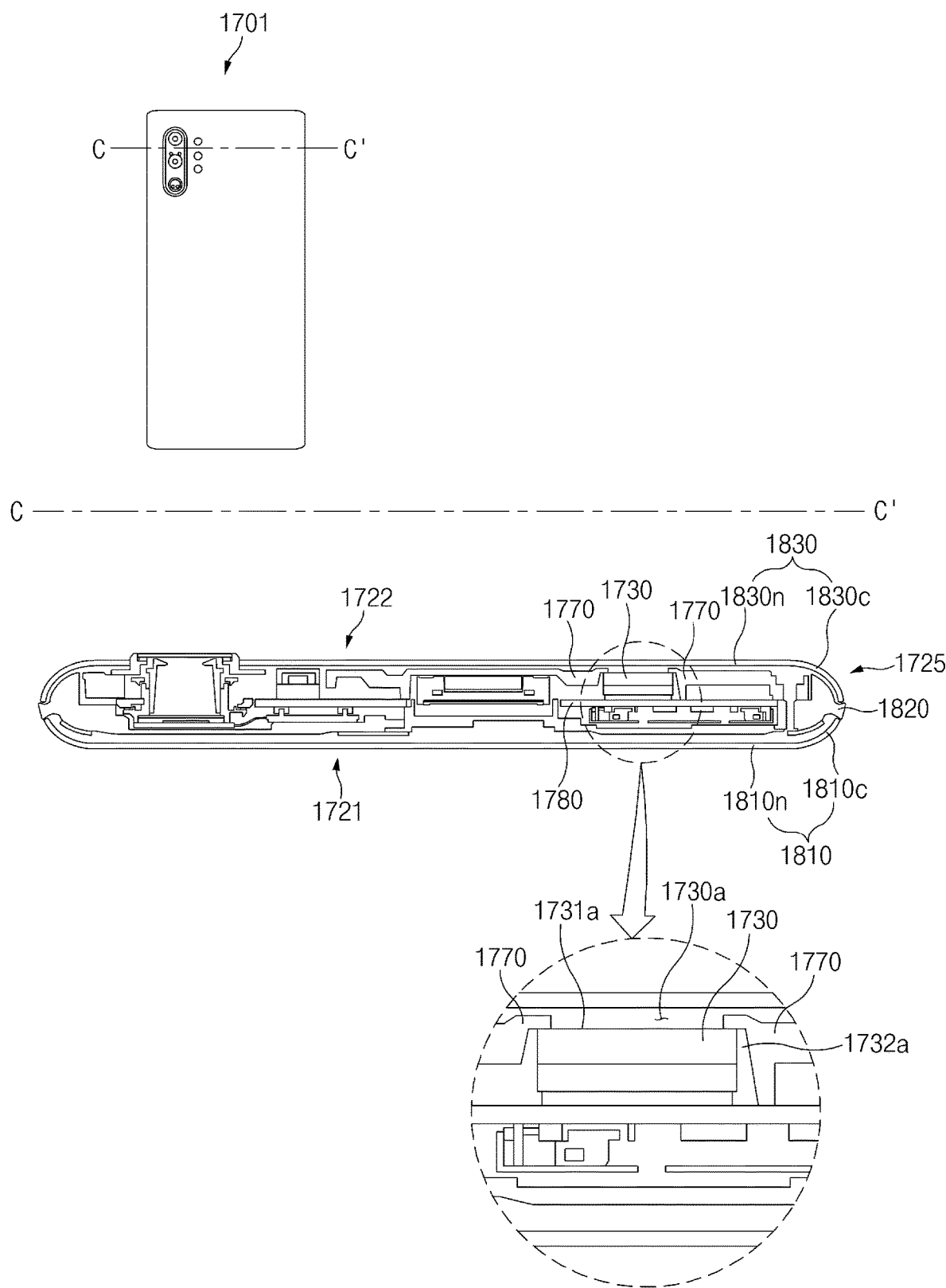
FIG. 20 is a cross-sectional view illustrating a region adjacent to a first antenna module according to various embodiments.

FIG. 20 is a cross-sectional view illustrating an example region adjacent to the first antenna module according to various embodiments.

Referring to FIG. 20, in a region adjacent to the first antenna module 1730, the electronic device 1701 may include the first plate 1810, the conductive structure 1820, the second plate 1830, the first antenna module 1730, a bracket 1770, or the main substrate 1780.

The first plate 1810 may include a non-conductive material (e.g., glass or plastic). The first plate 1810 may have a planar portion 1810n along and on the first surface 1721 of the housing 1720. The first plate 1810 may at least partially extend to the third lateral surface 1725 to define the curved portion 1810c. The curved portion 1810c may have a curved surface shape with a specified curvature.

The conductive structure 1820 may form a portion of the third lateral surface 1725 of the housing 1720. The conductive structure 1820 may be used as an antenna radiator for 4G or 3G communication.

The second plate 1830 may include a non-conductive material (e.g., glass or plastic). The second plate 1830 may have a planar portion 1830n along and on the second surface 1722 of the housing 1720. The second plate 1830 may at least partially extend to the third lateral surface 1725 to define the curved portion 1830c. The curved portion 1830c may have a curved surface shape having a specified curvature.

The conductive structure 1820 of the housing 1720 may be in contact with the curved portion 1830c of the second plate 1830 at one end (a rear end) of the conductive structure 1820. The conductive structure 1820 may contact the curved portion 1810c of the first plate 1810 at the other end (a front end) of the conductive structure 1820.

In the third lateral surface 1725, a height (or a thickness) of the curved portion 1830c of the second plate 1830 may be greater than a height (or a thickness) of the curved portion 1810c of the first plate 1810 or the conductive structure 1820. The curved portion 1830c of the second plate 1830 may be a window through which the mmWave signal from the first antenna module 1730 is radiated.

The first antenna module 1730 may have a first radiating surface 1731a. The first radiating surface 1731a may be a surface from which the first type antenna (e.g., a patch antenna) radiates the mmWave signal. The second radiating surface 1732a may be a surface being directed toward the second surface 1722 of the housing 1720. A radiating space (or an air gap) 1730a may be defined between the first radiating surface 1731a of the first antenna module 1730 and the second plate 1830. The first type antenna (e.g., a patch antenna 1731) may radiate the mmWave signal through radiating space (or an air gap) 1730a.

The first antenna module 1730 may have the second radiating surface 1732a. The second radiating surface 1732a may be a surface from which the second type antenna (e.g., dipole antenna) radiates an mmWave signal. The second radiating surface 1732a may be a surface being directed toward the third lateral surface 1725 of the housing 1720.

The bracket or support structure 1770 may fix the first antenna module 1730 and define the radiating space (or an air gap) 1730a.

On the main substrate 1780, the first antenna module 1730 may be mounted. The first antenna module 1730 may be electrically connected to a communication circuit and a processor via the main substrate 1780.

Figure 21:
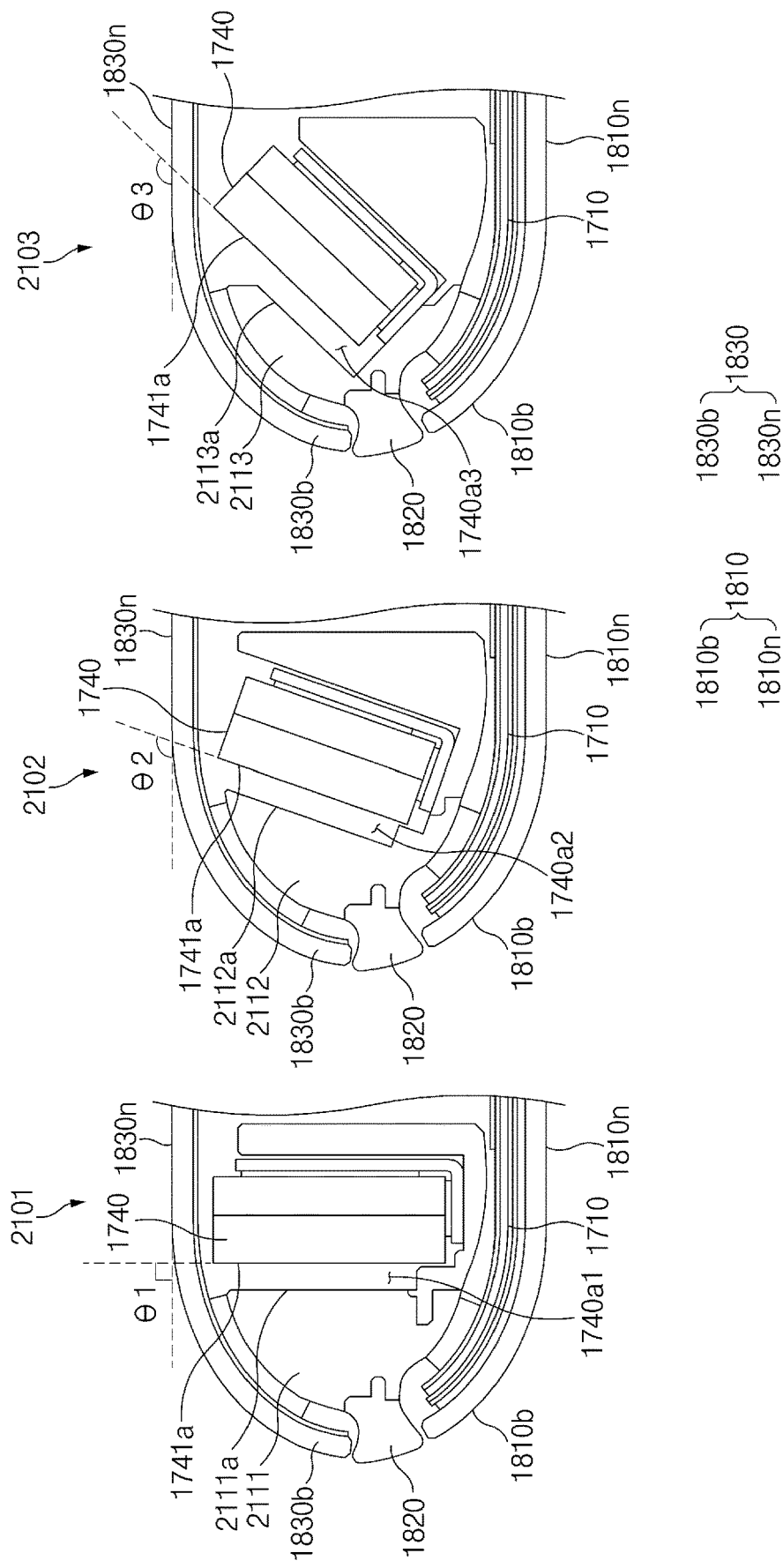
FIG. 21 is a diagram illustrating example placement tilt change of a second antenna module according to various embodiments.

FIG. 21 is a diagram illustrating example placement tilt change of the second antenna module according to various embodiments. FIG. 21 is illustrative and the disclosure is not limited thereto.

Referring to FIG. 21, in a first placement mode 2101, the second antenna module 1740 may have a first radiating surface 1741a perpendicular to the planar portion 1830n of the second plate 1830 or the planar portion 1810n of the first plate 1810. A first angle θ1 between the first radiating surface 1741a and the planar portion 1830n of the second plate 1830 may be 90 degrees. The first radiating surface 1741a may be a surface from which the first type antenna (e.g., a patch antenna) radiates the mmWave signal.

The second antenna module 1740 may radiate the mmWave signal through a radiating member (e.g., a PC (polycarbonate) part) 2111 and a curved portion 1830b of the second plate 1830. A first surface 2111a of the radiating member 2111 being directed toward the first radiating surface 1741a of the second antenna module 1740 may have a shape parallel to the first radiating surface 1741a. A radiating space (or an air gap) 1740a1 may be formed between the first surface 2111a of the radiating member 2111 and the first radiating surface 1741a of the second antenna module 1740.

In a second placement mode 2102, the second antenna module 1740 may have a tilted first radiating surface 1741a that is not perpendicular to the planar portion 1830n of second plate 1830 or the planar portion 1810n of first plate 1810. The second antenna module 1740 may be inclined such that the first radiating surface 1741a is directed toward a position between the planar portion 1830n and the curved portion 1830b of the second plate 1830. The first radiating surface 1741a of the second antenna module 1740 may form a second angle θ2>90 degrees with respect to the planar portion 1830n of the second plate 1830.

According to various embodiments, a radiating member (e.g., the PC part) 2112 may be changed in shape in a corresponding manner to an angle at which the second antenna module 1740 is inclined. For example, a first surface 2112a of the radiating member 2112 being directed toward the first radiating surface 1741a of the second antenna module 1740 may have a shape parallel to the first radiating surface 1741a. A radiating space (or an air gap) 1740a2 may be formed between the first surface 2112a of the radiating member 2112 and the first radiating surface 1741a of the second antenna module 1740.

In a third placement mode 2103, the second antenna module 1740 may have an inclined first radiating surface 1741a that is not perpendicular to the planar portion 1830n of the second plate 1830 or the planar portion 1810n of the first plate 1810. The first radiating surface 1741a of the second antenna module 1740 may form a third angle θ3 with respect to the planar portion 1830n of the second plate 1830 (θ2<θ3).

According to various embodiments, a radiating member (e.g., the PC part 2113) may be changed in shape corresponding to an angle at which the second antenna module 1740 is inclined. For example, a first surface 2113a of the radiating member 2113 being directed toward the first radiating surface 1741a of the second antenna module 1740 may have a shape parallel to the first radiating surface 1741a.

When the second antenna module 1740 is mounted in a tilted manner in the second placement mode 2102 or the third placement mode 2103, the first radiating surface 1741a may be moved away from the conductive structure 1820, so that the radiating performance of the mmWave signal may be improved. Further, in a corresponding manner to the placement mode of the second antenna module 1740, a thicknesses of each of the radiating members (e.g., the PC part) 2112 and 2113 become relatively smaller, or each of the radiating members (e.g., the PC part) 2112 and 2113 may have an even thickness over the entire first radiating surface 1741a. In this way, the radiating performance of the mmWave signal may be improved.

Figure 22:
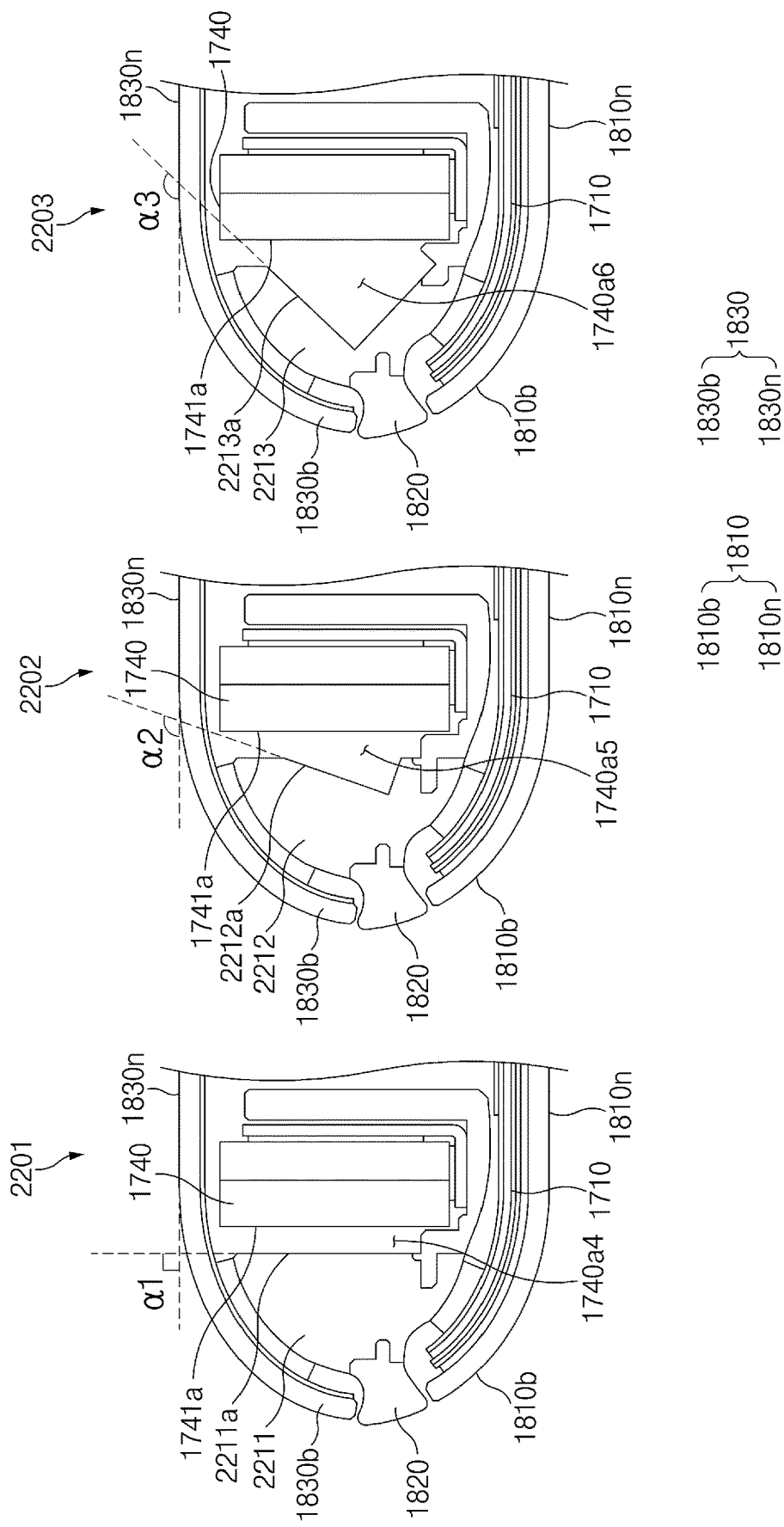
FIG. 22 is a diagram illustrating formation of an example radiating space in a radiating surface of a second antenna module according to various embodiments.

FIG. 22 is a diagram illustrating formation of radiating space at the radiating surface of the second antenna module according to various embodiments. FIG. 22 is illustrative and the disclosure is not limited thereto.

Referring to FIG. 22, in a first placement mode 2201, the second antenna module 1740 may have the first radiating surface 1741a perpendicular to the planar portion 1830n of the second plate 1830 or the planar portion 1810n of the first plate 1810. The first radiating surface 1741a may be a surface from which the first type antenna (e.g., a patch antenna) radiates the mmWave signal. The second antenna module 1740 may radiate the mmWave signal through a radiating member (e.g., the PC (polycarbonate) part) 2211 and the curved portion 1830b of the second plate 1830).

According to various embodiments, a first surface 2211a of the radiating member 2211 being directed toward first radiating surface 1741a may have a shape parallel to first radiating surface 1741a. The first surface 2211a of the radiating member 2211 and the planar portion 1830n of the second plate 1830 may be perpendicular to each other. A first angle α1 between the first surface 2211a of the radiating member 2211 and the planar portion 1830n of the second plate 1830 may be 90 degrees. A radiating space (or an air gap) 1740a4 may be formed between the first surface 2211a of the radiating member 2111 and the first radiating surface 1741a of the second antenna module 1740.

In a second placement mode 2202, at least a portion of the surface of a radiating member 2212 as directed toward the first radiating surface 1741a of the second plate 1830 may not be parallel to the first radiating surface 1741a of the second antenna module 1740. For example, at least a portion of the surface of the radiating member 2211 as directed toward the first radiating surface 1741a of the second plate 1830 may be construed to be away (depressed) from the first radiating surface 1741a. A first portion 2212a of the surface of the radiating member 2211 as directed toward the first radiating surface 1741a may form the second angle α2>90 degrees with respect to the planar portion 1830n of the second plate 1830.

When the surface of the radiating member 2212 directed towards the first radiating surface 1741a is depressed, a radiating space (or an air gap) 1740a5 defined between the radiating member 2112 and the first radiating surface 1741*a* of the second antenna module 1740 may be larger than that in the first placement mode 2201.

In a third placement mode 2203, the surface of a radiating member 2213 as directed toward the first radiating surface 1741*a* of the second plate 1830 may be at least partially non-parallel to the first radiating surface 1741*a* of the second antenna module 1740. For example, a first portion 2213*a* of the surface of the radiating member 2213 as directed toward the first radiating surface 1741*a* may form a third angle α3 with respect to the planar portion 1830*n* of the second plate 1830 (α2<α3). As the third angle α3 increases, the radiating space (or an air gap) 1740*a*6 may increase.

As in the second placement mode 2202 or third placement mode 2203, the larger the radiating space (or an air gap) 1740*a*5 or 1740*a*6, the better the radiating performance of the mmWave signal. Further, in a corresponding manner to the placement mode of the second antenna module 1740, a thickness of the radiating member (e.g., the PC part) 2212 or 2213 becomes relatively smaller, or the radiating member (e.g., the PC part) 2212 or 2213 may have an even thickness over the entire first radiating surface 1741*a*. In this way, the radiating performance of the mmWave signal may be improved.

According to various embodiments, features relating to the second antenna module 1740 of FIG. 21 and FIG. 22 may be applied equally or similarly to the third antenna module 1750 in FIG. 17.

An electronic device may include, for example, and without limitation, at least one of, for example, a portable communication device (e.g., a smartphone, a computer device (e.g., a PDA: personal digital assistant), a tablet PC, a laptop PC, a desktop PC, a workstation, or a server), a portable multimedia device (e.g., e-book reader or MP3 player), a portable medical device (e.g., heart rate, blood sugar, blood pressure, or body temperature measuring device), a camera, or a wearable device. The wearable device may include at least one of an accessory type device (e.g., watches, rings, bracelets, anklets, necklaces, glasses, contact lenses, or head wearable device head-mounted-device (HMD)), a fabric or clothing integral device (e.g., an electronic clothing), a body-attached device (e.g., skin pads or tattoos), or an bio implantable circuit. In some embodiments, the electronic device may include at least one of, for example, and without limitation, a television, a DVD (digital video disk) player, an audio device, an audio accessory device (e.g., a speaker, headphones, or a headset), a refrigerator, an air conditioner, a cleaner, an oven, a microwave oven, a washing machine, an air purifier, a set top box, a home automation control panel, a security control panel, a game console, an electronic dictionary, an electronic key, a camcorder, or an electronic picture frame.

In another embodiment, the electronic device may include, for example, and without limitation, at least one of a navigation device, GNSS (global navigation satellite system), an EDR (event data recorder (e.g., black box for vehicle/ship/airplane), an automotive infotainment device (e.g., vehicle head-up display), an industrial or home robot, a drone, ATM (automated teller machine), a POS (point of sales) instrument, a measurement instrument (e.g., water, electricity, or gas measurement equipment), or an Internet of Things device (e.g. bulb, sprinkler device, fire alarm, temperature regulator, or street light). The electronic device according to the embodiment of the disclosure is not limited to the above-described devices. Further, for example, as in a smart phone equipped with measurement of biometric information (e.g., a heart rate or blood glucose) of an individual, the electronic device may have a combination of functions of a plurality of devices. In the disclosure, the term "user" may refer to a person using the electronic device or a device (e.g., an artificial intelligence electronic device) using the electronic device.

Figure 23:
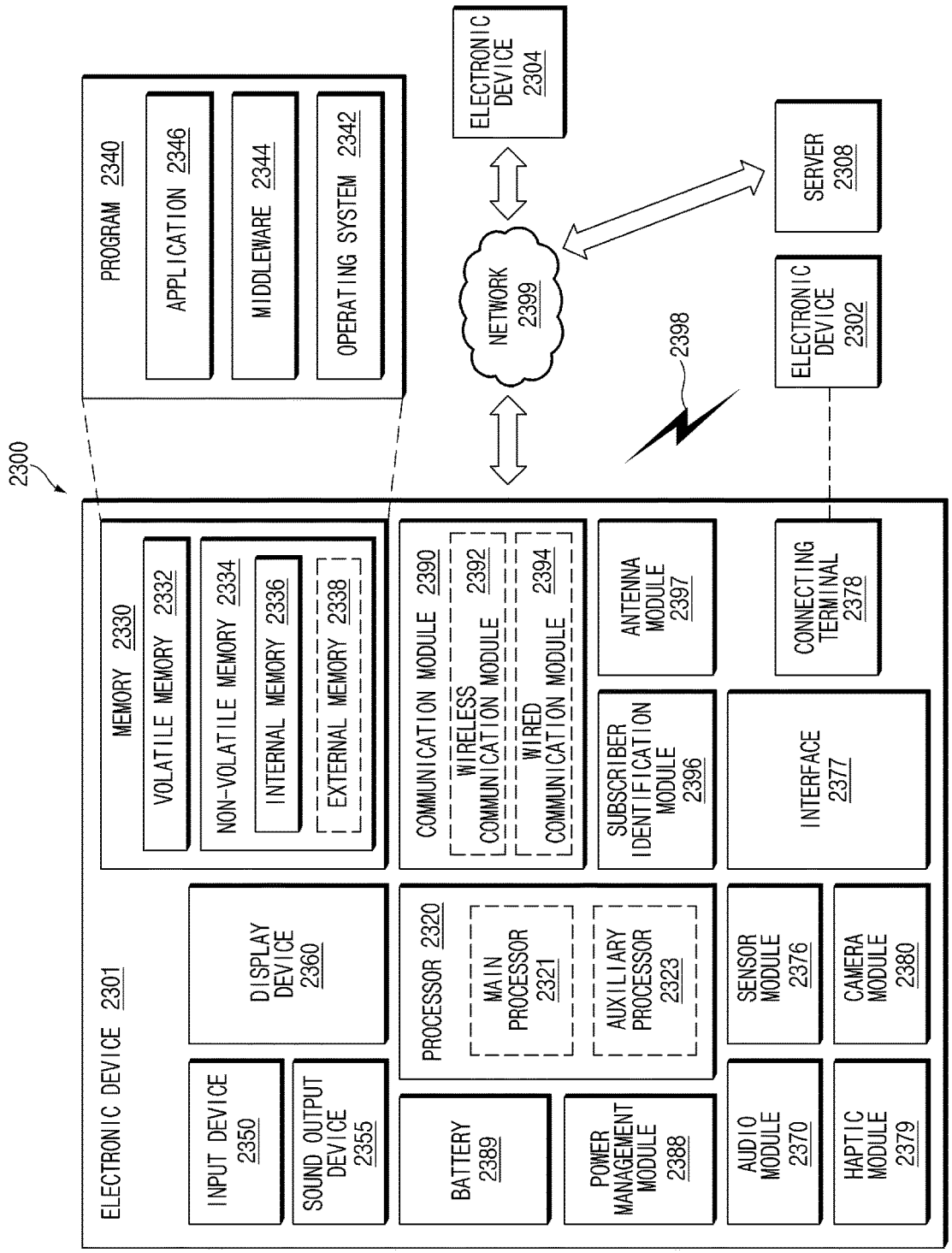
FIG. 23 is a block diagram illustrating an example electronic device in a network environment according to various embodiments.

FIG. 23 is a block diagram illustrating an example electronic device 2301 (e.g., the electronic device 101 of FIG. 1, the electronic device 1101 of FIG. 11, the electronic device 1201 of FIG. 12, and the electronic device 1701 of FIG. 17) in a network environment 2300 according to various embodiments. Referring to FIG. 23, the electronic device 2301 may communicate with an electronic device 2302 through a first network 2398 (e.g., a short-range wireless communication network) or may communicate with an electronic device 2304 or a server 2308 through a second network 2399 (e.g., a long-distance wireless communication network) in the network environment 2300. According to an embodiment, the electronic device 2301 may communicate with the electronic device 2304 through the server 2308. According to an embodiment, the electronic device 2301 may include a processor 2320, a memory 2330, an input device 2350, a sound output device 2355, a display device 2360, an audio module 2370, a sensor module 2376, an interface 2377, a haptic module 2379, a camera module 2380, a power management module 2388, a battery 2389, a communication module 2390, a subscriber identification module 2396, or an antenna module 2397 (e.g., the antenna modules 130, 140 and 150 of FIG. 1 and the antenna modules 1730, 1740, and 1750 of FIG. 17). According to some embodiments, at least one (e.g., the display device 2360 or the camera module 2380) among components of the electronic device 2301 may be omitted or one or more other components may be added to the electronic device 2301. According to some embodiments, some of the above components may be implemented with one integrated circuit. For example, the sensor module 2376 (e.g., a fingerprint sensor, an iris sensor, or an illuminance sensor) may be embedded in the display device 2360 (e.g., a display).

The processor 2320 may execute, for example, software (e.g., a program 2340) to control at least one of other components (e.g., a hardware or software component) of the electronic device 2301 connected to the processor 2320 and may process or compute a variety of data. According to an embodiment, as a part of data processing or operation, the processor 2320 may load a command set or data, which is received from other components (e.g., the sensor module 2376 or the communication module 2390), into a volatile memory 2332, may process the command or data loaded into the volatile memory 2332, and may store result data into a nonvolatile memory 2334. According to an embodiment, the processor 2320 may include a main processor 2321 (e.g., a central processing unit or an application processor) and an auxiliary processor 2323 (e.g., a graphic processing device, an image signal processor, a sensor hub processor, or a communication processor), which operates independently from the main processor 2321 or with the main processor 2321. Additionally or alternatively, the auxiliary processor 2323 may use less power than the main processor 2321, or is specified to a designated function. The auxiliary processor 2323 may be implemented separately from the main processor 2321 or as a part thereof.

The auxiliary processor 2323 may control, for example, at least some of functions or states associated with at least one component (e.g., the display device 2360, the sensor module 2376, or the communication module 2390) among the components of the electronic device 2301 instead of the main processor 2321 while the main processor 2321 is in an inactive (e.g., sleep) state or together with the main processor 2321 while the main processor 2321 is in an active (e.g., an application execution) state. According to an embodiment, the auxiliary processor 2323 (e.g., the image signal processor or the communication processor) may be implemented as a part of another component (e.g., the camera module 2380 or the communication module 2390) that is functionally related to the auxiliary processor 2323.

The memory 2330 may store a variety of data used by at least one component (e.g., the processor 2320 or the sensor module 2376) of the electronic device 2301. For example, data may include software (e.g., the program 2340) and input data or output data with respect to commands associated with the software. The memory 2330 may include the volatile memory 2332 or the nonvolatile memory 2334.

The program 2340 may be stored in the memory 2330 as software and may include, for example, an operating system 2342, a middleware 2344, or an application 2346.

The input device 2350 may receive a command or data, which is used for a component (e.g., the processor 2320) of the electronic device 2301, from an outside (e.g., a user) of the electronic device 2301. The input device 2350 may include, for example, a microphone, a mouse, a keyboard, or a digital pen (e.g., a stylus pen).

The sound output device 2355 may output a sound signal to the outside of the electronic device 2301. The sound output device 2355 may include, for example, a speaker or a receiver. The speaker may be used for general purposes, such as multimedia play or recordings play, and the receiver may be used for receiving calls. According to an embodiment, the receiver and the speaker may be either integrally or separately implemented.

The display device 2360 may visually provide information to the outside (e.g., the user) of the electronic device 2301. For example, the display device 2360 may include a display, a hologram device, or a projector and a control circuit for controlling a corresponding device. According to an embodiment, the display device 2360 may include a touch circuitry configured to sense the touch or a sensor circuit (e.g., a pressure sensor) for measuring an intensity of pressure on the touch.

The audio module 2370 may convert a sound and an electrical signal in dual directions. According to an embodiment, the audio module 2370 may obtain the sound through the input device 2350 or may output the sound through the sound output device 2355 or an external electronic device (e.g., the electronic device 2302 (e.g., a speaker or a headphone)) directly or wirelessly connected to the electronic device 2301.

The sensor module 2376 may generate an electrical signal or a data value corresponding to an operating state (e.g., power or temperature) inside or an environmental state (e.g., a user state) outside the electronic device 2301. According to an embodiment, the sensor module 2376 may include, for example, a gesture sensor, a gyro sensor, a barometric pressure sensor, a magnetic sensor, an acceleration sensor, a grip sensor, a proximity sensor, a color sensor, an infrared sensor, a biometric sensor, a temperature sensor, a humidity sensor, or an illuminance sensor.

The interface 2377 may support one or more designated protocols to allow the electronic device 2301 to connect directly or wirelessly to the external electronic device (e.g., the electronic device 2302). According to an embodiment, the interface 2377 may include, for example, an HDMI (high-definition multimedia interface), a USB (universal serial bus) interface, an SD card interface, or an audio interface.

A connecting terminal 2378 may include a connector that physically connects the electronic device 2301 to the external electronic device (e.g., the electronic device 2302). According to an embodiment, the connecting terminal 2378 may include, for example, an HDMI connector, a USB connector, an SD card connector, or an audio connector (e.g., a headphone connector).

The haptic module 2379 may convert an electrical signal to a mechanical stimulation (e.g., vibration or movement) or an electrical stimulation perceived by the user through tactile or kinesthetic sensations. According to an embodiment, the haptic module 2379 may include, for example, a motor, a piezoelectric element, or an electric stimulator.

The camera module 2380 may shoot a still image or a video image. According to an embodiment, the camera module 2380 may include, for example, at least one or more lenses, image sensors, image signal processors, or flashes.

The power management module 2388 may manage power supplied to the electronic device 2301. According to an embodiment, the power management module 2388 may be implemented as at least a part of a power management integrated circuit (PMIC).

The battery 2389 may supply power to at least one component of the electronic device 2301. According to an embodiment, the battery 2389 may include, for example, a non-rechargeable (primary) battery, a rechargeable (secondary) battery, or a fuel cell.

The communication module 2390 may establish a direct (e.g., wired) or wireless communication channel between the electronic device 2301 and the external electronic device (e.g., the electronic device 2302, the electronic device 2304, or the server 2308) and support communication execution through the established communication channel. The communication module 2390 may include at least one communication processor operating independently from the processor 2320 (e.g., the application processor) and supporting the direct (e.g., wired) communication or the wireless communication. According to an embodiment, the communication module 2390 may include a wireless communication module 2392 (e.g., a cellular communication module, a short-range wireless communication module, or a GNSS (global navigation satellite system) communication module) or a wired communication module 2394 (e.g., an LAN (local area network) communication module or a power line communication module). The corresponding communication module among the above communication modules may communicate with the external electronic device 2304 through the first network 2398 (e.g., the short-range communication network such as a Bluetooth, a WiFi direct, or an IrDA (infrared data association)) or the second network 2399 (e.g., the long-distance wireless communication network such as a cellular network, an internet, or a computer network (e.g., LAN or WAN)). The above-mentioned various communication modules may be implemented into one component (e.g., a single chip) or into separate components (e.g., chips), respectively. The wireless communication module 2392 may identify and authenticate the electronic device 2301 using user information (e.g., international mobile subscriber identity (IMSI)) stored in the subscriber identification module 2396 in the communication network, such as the first network 2398 or the second network 2399.

The antenna module 2397 may transmit or receive a signal or power to or from the outside (e.g., the external electronic device). According to an embodiment, the antenna module 2397 may include an antenna including a radiating element composed of a conductive material or a conductive pattern formed in or on a substrate (e.g., PCB). According to an embodiment, the antenna module 2397 may include a plurality of antennas. In such a case, at least one antenna appropriate for a communication scheme used in the communication network, such as the first network 2398 or the second network 2399, may be selected, for example, by the communication module 2390 from the plurality of antennas. The signal or the power may then be transmitted or received between the communication module 2390 and the external electronic device via the selected at least one antenna. According to an embodiment, another component (e.g., a radio frequency integrated circuit (RFIC)) other than the radiating element may be additionally formed as part of the antenna module 2397.

At least some components among the components may be connected to each other through a communication method (e.g., a bus, a GPIO (general purpose input and output), an SPI (serial peripheral interface), or an MIPI (mobile industry processor interface)) used between peripheral devices to exchange signals (e.g., a command or data) with each other.

According to an embodiment, the command or data may be transmitted or received between the electronic device 2301 and the external electronic device 2304 through the server 2308 connected to the second network 2399. Each of the electronic devices 2302 and 2304 may be the same or different types as or from the electronic device 2301. According to an embodiment, all or some of the operations performed by the electronic device 2301 may be performed by one or more external electronic devices among the external electronic devices 2302, 2304, or 2308. For example, when the electronic device 2301 performs some functions or services automatically or by request from a user or another device, the electronic device 2301 may request one or more external electronic devices to perform at least some of the functions related to the functions or services, in addition to or instead of performing the functions or services by itself. The one or more external electronic devices receiving the request may carry out at least a part of the requested function or service or the additional function or service associated with the request and transmit the execution result to the electronic device 2301. The electronic device 2301 may provide the result as is or after additional processing as at least a part of the response to the request. To this end, for example, a cloud computing, distributed computing, or client-server computing technology may be used.

An electronic device according to various example embodiments (e.g., the electronic device 101 of FIG. 1) may include a display (e.g., the display 110 of FIG. 1), a housing (e.g., the housing 120 of FIG. 1) having a first surface (e.g., the first surface 121 of FIG. 1) through which the display (e.g., the display 110 of FIG. 1) is viewable to an outside, a second surface (e.g., the second surface 122 in FIG. 1) opposite the first surface e.g., the first surface 121 of FIG. 1), lateral surfaces between the first surface (e.g., the first surface 121 of FIG. 1) and the second surface (e.g., the second surface 122 of FIG. 1), a first antenna module including at least one antenna (e.g., the first antenna module 130 of FIG. 1) disposed adjacent to a first lateral surface (e.g., the first lateral surface 123 of FIG. 1) of the lateral surfaces inside the housing (e.g., the housing 120 of FIG. 1), and a second antenna module including at least one antenna (e.g., the second antenna module 140 of FIG. 1) disposed adjacent to a second lateral surface (e.g., the second lateral surface 124 of FIG. 1) of the lateral surfaces inside the housing (e.g., the housing 120 of FIG. 1). The housing (e.g., the housing 120 in FIG. 1) may include a first plate (e.g., the first plate 210 in FIG. 2) covering the first surface (e.g., the first surface 121 in FIG. 1), a second plate (e.g., the second surface 230 of FIG. 2) covering the second surface (e.g., the second surface 122 in FIG. 1), and a conductive structure comprising a conductive material (e.g., the conductive structure 220 in FIG. 2) disposed between the first surface (e.g., the first surface 121 of FIG. 1) and the second surface (e.g., the second surface 122 of FIG. 1) and at least partially exposed to the outside through the lateral surfaces. A height of a portion of the second plate (e.g., the second plate 230 in FIG. 2) extending in and along the first lateral surface (e.g., the first lateral surface 123 in FIG. 1) may be less than a height of a portion of the second plate (e.g., the second plate 230 in FIG. 2) extending in and along the second lateral surface (e.g., the second lateral surface 124 in FIG. 1).

According to various example embodiments, each of the first antenna module (e.g., the first antenna module 130 of FIG. 1) and the second antenna module (e.g., the second antenna module 140 of FIG. 1) may be configured to transmit and receive a signal of a mmWave frequency band as a first frequency band.

According to various example embodiments, at least a portion of the conductive structure (e.g., the conductive structure 220 of FIG. 2) may include an antenna radiator configured to transmit and receive a signal of a second frequency band other than the first frequency band.

According to various example embodiments, a height of a portion of the second plate (e.g., the second plate 230 of FIG. 2) extending in and along the first lateral surface (e.g., the first lateral surface 123 of FIG. 1) may be less than a height of the conductive structure (e.g., the conductive structure 220 of FIG. 2) defining the first lateral surface (e.g., the first lateral surface 123 of FIG. 1).

According to various example embodiments, a height of a portion of the first plate (e.g., the first plate 210 of FIG. 2) extending in and along the first lateral surface (e.g., the first lateral surface 123 of FIG. 1) may be less than a height of the conductive structure (e.g., the conductive structure 220 of FIG. 2) of the first lateral surface (e.g., the first lateral surface 123 of FIG. 1) or a height of a portion of the second plate (e.g., the second plate 230 of FIG. 2) extending in and along the first lateral surface (e.g., the first lateral surface 123 of FIG. 1).

According to various example embodiments, a height of a portion of the second plate (e.g., the second plate 230 of FIG. 2) extending in and along the second lateral surface (e.g., the second lateral surface 124 of FIG. 1) may be greater than a height of a portion of the second plate (e.g., the second plate 230 in FIG. 2) extending in and along the first lateral surface (e.g., the first lateral surface 123 of FIG. 1).

According to various example embodiments, the first lateral surface (e.g., the first lateral surface 123 of FIG. 1) may be perpendicular to the second lateral surface (e.g., the second lateral surface 124 of FIG. 1).

According to various example embodiments, a height of a portion of the second plate (e.g., the second plate 230 of FIG. 2) extending in and along the second lateral surface (e.g., the second lateral surface 124 of FIG. 1) may be greater than a height of the conductive structure (e.g., the conductive structure 220 in FIG. 2) defining the second lateral surface (e.g., the second lateral surface 124 of FIG. 1).

According to various example embodiments, a height of a portion of the second plate (e.g., the second plate 230 of FIG. 2) extending in and along the second lateral surface (e.g., the second lateral surface 124 of FIG. 1) may be greater than a height of a portion of the first plate (e.g., the first plate 210 of FIG. 2) extending in and along the second lateral surface (e.g., the second lateral surface 124 of FIG. 1).

According to various example embodiments, the first antenna module (e.g., the first antenna module 130 of FIG. 1) may include a first type antenna (e.g., the first type antenna 131 of FIG. 3) and a second type antenna (e.g., the second type antenna 132 of FIG. 3), the first type antenna having different radiating surfaces than the second type antenna.

According to various example embodiments, the first type antenna (e.g., the first type antenna 131 of FIG. 3) includes a radiating surface directed toward the second surface (e.g., the second surface 122 of FIG. 1). The second type antenna (e.g., the second type antenna 132 of FIG. 3) may include a radiating surface directed toward the first lateral surface (e.g., the first lateral surface 123 of FIG. 1).

According to various example embodiments, the first type antenna (e.g., the first type antenna 131 of FIG. 3) may include a patch antenna, and the second type antenna (e.g., the second type antenna 132 in FIG. 3) may include a dipole antenna.

According to various example embodiments, the second antenna module (e.g., the second antenna module 140 of FIG. 1) may include a first type antenna having a radiating surface directed toward the second lateral surface (e.g., the second lateral surface 124 of FIG. 1). The first type antenna may include a patch antenna.

According to various example embodiments, the electronic device (e.g., the electronic device 101 of FIG. 1) may further include a third antenna module (e.g., the third antenna module 150 in FIG. 1) including at least one antenna disposed adjacent to a third lateral surface (e.g., the third lateral surface 125 of FIG. 1) of the lateral surfaces opposite to the second lateral surface (e.g., the second lateral surface 124 in FIG. 1) within a housing (e.g., the housing 120 in FIG. 1). A height of a portion of the second plate (e.g., the second plate 230 of FIG. 2) extending in and along the third lateral surface (e.g., the third lateral surface 125 of FIG. 1) may be equal to a height of a portion of the second plate (e.g., the second plate 230 of FIG. 2) extending in and along the second lateral surface (e.g., the second lateral surface 124 of FIG. 1).

According to various example embodiments, a height of the conductive structure surfaces (e.g., the conductive structure 220 in FIG. 2) defining a fourth lateral surface (e.g., the fourth lateral surface 126 in FIG. 1) of the lateral surfaces opposite to the first lateral surface (e.g., the first lateral surface 123 of FIG. 1) within the housing (e.g., the housing 120 of FIG. 1) may be greater than a height of a portion of the first plate (e.g., the first plate 210 of FIG. 2) extending in and along the fourth lateral surface (e.g., the fourth lateral surface 126 of FIG. 1) or a height of a portion of the second plate (e.g., the second plate 230 in FIG. 2) extending in and along the fourth lateral surface (e.g., the fourth lateral surface 126 of FIG. 1).

According to various example embodiments, the electronic device (e.g., the electronic device 101 of FIG. 1) may further include a light-emission element including light emitting circuitry (e.g., the light-emission element 1250 of FIG. 12) configured to emit light toward the second surface (e.g., the second surface 122 of FIG. 1) based on an operation state of the first antenna module (e.g., the first antenna module 130 of FIG. 1) or the second antenna module (e.g., the second antenna module 140 of FIG. 1)

An electronic device (e.g., the electronic device 1701 of FIG. 17) according to various example embodiments may include a display (e.g., the display 1710 of FIG. 17), a housing (e.g., the housing 1720 of FIG. 17) including a first surface through which at least a portion of the display is viewable (e.g., the display 1710 in FIG. 17), a second surface facing the first surface, and lateral surfaces (e.g., the lateral surfaces 1723, 1724, 1725 and 1726 in FIG. 17) surrounding a space between the first surface and the second surface, wherein the housing (e.g., the housing 1720 in FIG. 17) includes a first plate (e.g., the first plate 1810 of FIG. 18) defining the first surface, a second plate (e.g., the second plate 1830 of FIG. 18) defining the second surface, and a conductive structure comprising a conductive material (e.g., the conductive structure 1820 of FIG. 18) disposed between the first surface and the second surface and defining at least some lateral surfaces, a first antenna module comprising at least one antenna (e.g., the first antenna module 1730 in FIG. 17) disposed adjacent to a first lateral surface (e.g., the first lateral surface 1723 of FIG. 17) of the lateral surfaces inside the housing (e.g., the housing 1720 of FIG. 17), and a second antenna module comprising at least one antenna (e.g., the third antenna module 1750 in FIG. 17) disposed adjacent to a second lateral surface (e.g., the third lateral surface 1725 of FIG. 17) of the lateral surfaces inside the housing (e.g., the housing 1720 of FIG. 17), wherein the first antenna module (e.g., the first antenna module 1730 in FIG. 17) includes a first type antenna including a first radiating surface directed toward the second surface (e.g., the second surface 1722 in FIG. 17) and a second type antenna including a second radiating surface directed toward the second lateral surface.

According to various example embodiments, the second radiating surface may be arranged to overlap with a portion of the second plate (e.g., the second plate 1830 of FIG. 18) extending to the second lateral surface when viewed from the second lateral surface.

According to various example embodiments, the housing (e.g., the housing 1720 of FIG. 17) may include an opening included in the second lateral surface (e.g., the third lateral surface 1725 of FIG. 17) and configured to expose a physical button, wherein the second radiating surface may be disposed in a first direction of the opening, wherein a third radiating surface of the second antenna module (e.g., the third antenna module 1750 in FIG. 17) may be provided in a second direction of the opening.

An electronic device (e.g., the electronic device 1701 of FIG. 17) according to various example embodiments may include a housing (e.g., the housing 1720 of FIG. 17) including a first plate (e.g., the first plate 1810 of FIG. 18) including a first planar portion and a first curved portion extending from the first planar portion, a second plate (e.g., the second plate 1830 of FIG. 18) including a second planar portion and a second curved portion extending from the second planar portion, and a conductive structure comprising a conductive material (e.g., the conductive structure 1820 in FIG. 18) disposed between the first plate (e.g., the first plate 1810 of FIG. 18) and the second plate (e.g., the second plate 1830 of FIG. 18) and defining at least some lateral surfaces of the electronic device (e.g., the electronic device 1701 of FIG. 17), an antenna module including at least one antenna (e.g., the second antenna module 1740 in FIG. 17) disposed adjacent to a first lateral surface (e.g., the second lateral surface 1724 of FIG. 17) of the lateral surfaces inside the housing (e.g., the housing 1720 of FIG. 17), and a wireless communication circuit electrically connected with the antenna module (e.g., the second antenna module 1740 of FIG. 17), wherein the wireless communication circuit is configured to transmit and receive at least one signal having a frequency between 6 GHz and 100 GHz through the antenna module (e.g., the second antenna module 1740 in FIG. 17), wherein the antenna module (e.g., the second antenna module 1740 in FIG. 17) is fixed by a support disposed inside the housing (e.g., the housing 1720 in FIG. 17), wherein when viewed from the first lateral surface (e.g., the second lateral surface 1724 of FIG. 17), at least a portion of the antenna module (e.g., the second antenna module 1740 of FIG. 17) is positioned to overlap the second curved portion, wherein the second curved portion covers an area of at least half of the first lateral surface (e.g., the second lateral surface 1724 of FIG. 17), wherein the second plate (e.g., the second plate 1830 in FIG. 18) includes an inorganic oxide.

According to an example embodiment, the electronic device (e.g., the electronic device 1701 of FIG. 17) may further include a display (e.g., the display 1710 of FIG. 17), wherein the first plate (e.g., the first plate 1810 in FIG. 18) may include a glass cover that covers the display (e.g., the display 1710 in FIG. 17), wherein the second plate (e.g., the second plate 1830 in FIG. 18) may be a back cover.

According to another example embodiment, the electronic device (e.g., the electronic device 1701 of FIG. 17) may further include a display (e.g., the display 1710 of FIG. 17), wherein the second plate (e.g., the second plate 1830 in FIG. 18) may be a glass cover that covers the display (e.g., the display 1710 in FIG. 17), wherein the first plate (e.g., the first plate 1810 in FIG. 18) may be a back cover.

According to various example embodiments, the inorganic oxide may be include least one of glass, ceramic, sapphire.

According to various embodiments, the antenna module (e.g., the second antenna module 1740 of FIG. 17) may include, in the first lateral surface (e.g., the second lateral surface 1724 of FIG. 17), non-conductive members comprising non-conductive material (e.g., the radiating members 2111, 2112, and 2113 in FIG. 21) between the second curved portion and the radiating surface of the antenna module (e.g., the second antenna module 1740 of FIG. 17). An air gap may be defined between the non-conductive member (e.g., the radiating members 2111, 2112, 2113 in FIG. 21), the second curved portion, and the radiating surface.

According to various example embodiments, the antenna module (e.g., the second antenna module 1740 of FIG. 17) may include a first type antenna including a radiating surface directed toward a position between the second planar portion and the second curved portion.

An electronic device (e.g., the electronic device 101 of FIG. 1) according to various example embodiments may include a housing (e.g., the housing 120 of FIG. 1), wherein the housing (e.g., the housing 120 of FIG. 1) includes a first non-conductive plate (e.g., the first plate 210 of FIG. 2), a second non-conductive plate (e.g., the second plate 230 of FIG. 2), and a conductive lateral member comprising a conductive material (e.g., the conductive structure 220 of FIG. 2) surrounding a space between the first non-conductive plate (e.g., the first plate 210 of FIG. 2) and the second non-conductive plate (e.g., the second plate 230 of FIG. 2), wherein the first non-conductive plate (e.g., the first plate 210 in FIG. 2) includes a first planar portion, a first curved portion, a second curved portion, and a third curved portion, wherein when viewed from above the first non-conductive plate (e.g., the first plate 210 in FIG. 2), the first planar portion includes a first lateral portion extending in a first direction, a second lateral portion extending in a second direction perpendicular to the first direction, a third lateral portion extending in a third direction parallel to the second direction, and a fourth lateral portion extending in a fourth direction parallel to the first direction, wherein the first curved portion extends from the first lateral portion of the first planar portion, wherein the second curved portion extends from the second lateral portion of the first planar portion, wherein the third curved portion extends from the third lateral portion of the first planar portion, wherein the second non-conductive plate (e.g., the second plate 230 in FIG. 2) includes a second planar portion, a fourth curved portion, a fifth curved portion, and a sixth curved portion, wherein when viewed from above the second plate (e.g., the second plate 230 in FIG. 2), the second planar portion includes a fifth lateral portion parallel to the first lateral portion, a sixth lateral portion parallel to the second lateral portion, a seventh lateral portion parallel to the third lateral portion, and an eighth lateral portion parallel to the fourth lateral portion, wherein the fourth curved portion extends from the fifth lateral portion of the second planar portion, wherein the fifth curved portion extends from the sixth lateral portion of the second planar portion, wherein the sixth curved portion extends from the seventh lateral portion of the second planar portion, wherein the conductive lateral member (e.g., the conductive structure 220 in FIG. 2) includes a first conductive portion disposed between the first curved portion and the fourth curved portion; a second conductive portion disposed between the second curved portion and the fifth curved portion; a third conductive portion disposed between the third curved portion and the sixth curved portion; and a fourth conductive portion disposed between the fourth lateral portion and the eighth lateral portion, a display (e.g., the display 110 in FIG. 1) visible through the first non-conductive plate (e.g., the first plate 210 in FIG. 2), a first antenna structure comprising at least one antenna (e.g., the first antenna module 130 of FIG. 1) disposed in the space and adjacent to the first conductive portion of the conductive lateral member (e.g., the conductive structure 220 of FIG. 2), wherein the first antenna structure (e.g., the first antenna module 130 of FIG. 1) includes a first surface directed toward the second non-conductive plate (e.g., the second plate 230 of FIG. 2), and at least one conductive plate directed toward the second non-conductive plate (e.g., the second plate 230 in FIG. 2), a second antenna structure comprising at least one antenna (e.g., the second antenna module 140 of FIG. 1) disposed in the space and adjacent to the second conductive portion of the conductive lateral member (e.g., the conductive structure 220 of FIG. 2), wherein the second antenna structure (e.g., the second antenna module 140 of FIG. 1) includes a second surface directed toward the second conductive portion, and at least one conductive plate directed toward the second conductive portion, a third antenna structure comprising at least one antenna (e.g., the third antenna module 150 of FIG. 1) disposed in the space and adjacent to the third conductive portion of the conductive lateral member (e.g., the conductive structure 220 of FIG. 2), wherein the third antenna structure (e.g., the third antenna module 150 in FIG. 1) includes a third surface directed toward the third conductive portion, and at least one conductive plate directed toward the third conductive portion, and a wireless communication circuit electrically connected to at least one of the first antenna structure (e.g., the first antenna module 130 of FIG. 1), the second antenna structure (e.g., the second antenna module 140 of FIG. 1) or the third antenna structure (e.g., the third antenna module 150 of FIG. 1), wherein the wireless communication circuit is configured to transmit and receive at least one signal with a frequency between 3 GHz and 100 GHz through at least one of the first antenna structure (e.g., the first antenna module 130 of FIG. 1), the second antenna structure (e.g., the second antenna module 140 of FIG. 1) or the third antenna structure (e.g., the third antenna module 150 of FIG. 1), wherein a first height H1 between the second planar portion and the first conductive portion, a second height H2 between the second planar portion and the second conductive portion, a third height H3 between the second planar portion and the third conductive portion, and a fourth height H4 between the second planar portion and the fourth conductive portion have a relationship: H2>H1>H4.

According to various example embodiments, the second height H2 may be the equal to the third height H3.

According to various example embodiments, a fifth height H5 between the first planar portion and the first conductive portion, a sixth height H6 between the first planar portion and the second conductive portion, a seventh height H7 between the first planar portion and the third conductive portion, and an eighth height H8 between the first planar portion and the fourth conductive portion may have a relationship: H5<H1, H6<H2, and H7<H3.

The electronic device according to various example embodiments disclosed in the disclosure may be various types of devices. The electronic device may include, for example, a portable communication device (e.g., a smartphone), a computer device, a portable multimedia device, a mobile medical appliance, a camera, a wearable device, or a home appliance. The electronic device according to an embodiment of the disclosure should not be limited to the above-mentioned devices.

It should be understood that various embodiments of the disclosure and terms used in the embodiments are not intended to limit technical features disclosed in the disclosure to a particular embodiment disclosed herein; rather, the disclosure should be understood to cover various modifications, equivalents, and/or alternatives of embodiments of the disclosure. With regard to description of drawings, similar or related components may be assigned with similar reference numerals. As used herein, singular forms of noun corresponding to an item may include one or more items unless the context clearly indicates otherwise. In the disclosure disclosed herein, each of the expressions "A or B", "at least one of A and B", "at least one of A or B", "A, B, or C", "one or more of A, B, and C", or "one or more of A, B, or C", and the like used herein may include any and all combinations of one or more of the associated listed items. The expressions, such as "a first", "a second", "the first", or "the second", may be used merely for the purpose of distinguishing a component from the other components, but do not limit the corresponding components in other aspect (e.g., the importance or the order). It is to be understood that if an element (e.g., a first element) is referred to, with or without the term "operatively" or "communicatively", as "coupled with," "coupled to," "connected with," or "connected to" another element (e.g., a second element), the element may be coupled with the other element directly (e.g., wiredly), wirelessly, or via a third element.

The term "module" used in the disclosure may include a unit implemented in hardware, software, or firmware, or any combination thereof, and may be interchangeably used with the terms "logic", "logical block", "part" and "circuit". The "module" may be a minimum unit of an integrated part or may be a part thereof. The "module" may be a minimum unit for performing one or more functions or a part thereof. For example, according to an embodiment, the "module" may include an application-specific integrated circuit (ASIC).

Various embodiments of the disclosure may be implemented by software (e.g., the program 2340) including an instruction stored in a machine-readable storage medium (e.g., an internal memory 2336 or an external memory 2338) readable by a machine (e.g., the electronic device 2301). For example, the processor (e.g., the processor 2320) of a machine (e.g., the electronic device 2301) may call the instruction from the machine-readable storage medium and execute the instructions thus called. This means that the machine may perform at least one function based on the called at least one instruction. The one or more instructions may include a code generated by a compiler or a code executable by an interpreter. The machine-readable storage medium may be provided in the form of non-transitory storage medium. Here, the "non-transitory storage medium is tangible, but may not include a signal (e.g., an electromagnetic wave). The term "non-transitory" does not differentiate a case where the data is permanently stored in the storage medium from a case where the data is temporally stored in the storage medium.

According to an embodiment, a method according to various embodiments disclosed in the disclosure may be provided as a part of a computer program product. The computer program product may be traded between a seller and a buyer as a product. The computer program product may be distributed in the form of machine-readable storage medium (e.g., a compact disc read only memory (CD-ROM)) or may be directly distributed (e.g., download or upload) online through an application store (e.g., a Play Store™) or between two user devices (e.g., the smartphones). In the case of online distribution, at least a portion of the computer program product may be temporarily stored or generated in a machine-readable storage medium such as a memory of a manufacturer's server, an application store's server, or a relay server.

According to various example embodiments, each component (e.g., the module or the program) of the above-described components may include one or plural entities. According to various embodiments, at least one or more components of the above components or operations may be omitted, or one or more components or operations may be added. Alternatively or additionally, some components (e.g., the module or the program) may be integrated in one component. In this case, the integrated component may perform the same or similar functions performed by each corresponding components prior to the integration. According to various embodiments, operations performed by a module, a programming, or other components may be executed sequentially, in parallel, repeatedly, or in a heuristic method, or at least some operations may be executed in different sequences, omitted, or other operations may be added.

The electronic device according to various example embodiments disclosed in the disclosure may have the antenna for 4G communication and antenna for 5G communication mounted therein. In this connection, the 5G communication antenna may be disposed on each of a top surface and left and right lateral surfaces of the device to output a signal in a mmWave frequency band in various directions.

The electronic device according to various example embodiments disclosed in the disclosure may improve transmission and reception performance of the mmWave signal by variously changing the placement mode of the antenna for 5G communication.

The electronic device according to various example embodiments disclosed in the disclosure may include the light-emission element that emits light based on the operation state of the antenna for 5G communication.

While the disclosure has been illustrated and described with reference to various example embodiments thereof, it will be understood by those skilled in the art that various changes in form and details may be made therein without departing from the spirit and scope of the disclosure, including the appended claims and their equivalents.

What is claimed is:

1. An electronic device comprising:
a first non-conductive cover defining at least a portion of a first surface of the electronic device;
a second non-conductive cover including a first portion defining at least a portion of a second surface of the electronic device opposite the first surface, and a second portion extending from an edge of the first portion and defining one portion of a first lateral surface of the electronic device between the first surface and the second surface;
a conductive frame defining another portion of the first lateral surface of the electronic device; and
a first antenna module including one surface defining a radiator,
wherein the first antenna module is positioned so that the one surface is substantially perpendicular to the second surface at a position within a specified proximity to the first lateral surface of the electronic device and is configured to transmit and/or receive a signal through the first lateral surface,
wherein the second non-conductive cover comprises glass,
wherein at least a half of the one surface of the first antenna module is directed toward the second portion of the second non-conductive cover.

2. The electronic device of claim 1, further comprising:
a display, wherein the first non-conductive cover is a glass cover covering the display, and wherein the second non-conductive cover is a back cover.

3. The electronic device of claim 1, further comprising:
a display, wherein the second non-conductive cover is a glass cover covering the display, and wherein the first non-conductive cover is a back cover.

4. The electronic device of claim 1, wherein the second non-conductive cover includes an inorganic oxide, and wherein the inorganic oxide includes at least one of glass, ceramic or sapphire.

5. The electronic device of claim 1, wherein the first antenna module includes a non-conductive member comprising non-conductive material disposed between the second portion and the one surface of the first antenna module.

6. The electronic device of claim 5, wherein an air gap is defined between the non-conductive member, the second portion and the one surface.

7. The electronic device of claim 1, wherein the first antenna module includes a first type antenna having a radiating surface directed toward a position between the first portion and the second portion.

8. The electronic device of claim 1, wherein the one surface of the first antenna module partially overlaps the conductive frame.

9. The electronic device of claim 1, wherein the first portion includes a planar portion, and wherein the second portion includes a curved portion extending from an edge of the planar portion.

10. The electronic device of claim 1, wherein the first antenna module is configured to transmit and/or receive the signal having a frequency between 6 GHz and 100 GHz.

11. The electronic device of claim 1, further comprising a second antenna module;
wherein the second antenna module includes:
a first type antenna including a first radiating surface directed toward the second surface; and
a second type antenna including a second radiating surface directed toward a second lateral surface of the electronic device.

12. The electronic device of claim 11, wherein at least a portion of the second radiating surface is positioned to be directed toward a portion of the second non-conductive cover extending to the second lateral surface when viewed from the second lateral surface.

13. The electronic device of claim 11, wherein the conductive frame includes an opening in the first lateral surface configured to expose a physical button,
wherein the second radiating surface is provided in a first direction of the opening, and
wherein a third radiating surface of the first antenna module is provided in a second direction of the opening.

14. The electronic device of claim 11, wherein each of the first antenna module and the second antenna module is configured to transmit or receive a signal having a mmWave frequency band as a first frequency band.

15. The electronic device of claim 11, wherein at least a portion of the conductive frame is configured to act as an antenna radiator configured to transmit and receive a signal of a second frequency band.

16. The electronic device of claim 11, wherein a height of a portion of the second non-conductive cover extending along the second lateral surface is less than a height of a portion of the second non-conductive cover extending along the first lateral surface.

17. The electronic device of claim 16, wherein the height of the portion of the second non-conductive cover extending along the second lateral surface is less than a height of the conductive frame defining the second lateral surface.

18. The electronic device of claim 16, wherein a height of a portion of the first non-conductive cover extending along the second lateral surface is less than a height of the conductive frame defining the second lateral surface or the height of the portion of the second non-conductive cover extending along the second lateral surface.

19. The electronic device of claim 16, wherein a height of a portion of the second non-conductive cover extending along the first lateral surface is greater than the height of a portion of the first non-conductive cover extending along the second lateral surface.

20. The electronic device of claim 16, wherein the height of the portion of the second non-conductive cover extending along the first lateral surface is greater than a height of the conductive frame defining the first lateral surface.

* * * * *